United States Patent
Ono et al.

(10) Patent No.: US 7,697,823 B2
(45) Date of Patent: Apr. 13, 2010

(54) RECORDING CONTROL APPARATUS, RECORDING CONTROL METHOD, AND PROGRAM USED THEREWITH

(75) Inventors: Takaya Ono, Kanagawa (JP); Hideki Ando, Kanagawa (JP); Satoshi Katsuo, Kanagawa (JP); Takashi Furukawa, Kanagawa (JP); Hisao Tanaka, Tokyo (JP); Takayoshi Kawamura, Kanagawa (JP); Motohiro Terao, Kanagawa (JP); Masaki Hirose, Kanagawa (JP)

(73) Assignee: Sony Corporation, Tokyo (JP)

( * ) Notice: Subject to any disclaimer, the term of this patent is extended or adjusted under 35 U.S.C. 154(b) by 1057 days.

(21) Appl. No.: 10/726,082

(22) Filed: Dec. 2, 2003

(65) Prior Publication Data

US 2005/0025450 A1    Feb. 3, 2005

(30) Foreign Application Priority Data

Dec. 3, 2002    (JP)    ............................ P2002-351138

(51) Int. Cl.
*H04N 5/00*    (2006.01)
*H04N 5/91*    (2006.01)

(52) U.S. Cl. ........................................ 386/125; 386/83
(58) Field of Classification Search .................. 386/46, 386/95, 96, 125, 126; 711/170; 370/242
See application file for complete search history.

(56) References Cited

U.S. PATENT DOCUMENTS

| | | | |
|---|---|---|---|
| 6,014,368 A * | 1/2000 | Sanami | 370/242 |
| 6,023,744 A | 2/2000 | Shoroff et al. | |
| 6,122,436 A * | 9/2000 | Okada et al. | 386/126 |
| 6,205,529 B1 * | 3/2001 | Shagam | 711/170 |
| 6,314,235 B1 * | 11/2001 | Gotoh et al. | 386/95 |
| 6,373,803 B2 * | 4/2002 | Ando et al. | 369/59.25 |
| 6,438,084 B2 * | 8/2002 | Kawashima et al. | 369/53.22 |
| 6,658,196 B2 | 12/2003 | Sakai et al. | |
| 2004/0013008 A1 | 1/2004 | Kondo | |

FOREIGN PATENT DOCUMENTS

| | | |
|---|---|---|
| EP | 0 973 333 | 1/2000 |
| EP | 1 267 266 | 12/2002 |
| JP | 63 173270 | 7/1988 |

(Continued)

OTHER PUBLICATIONS

Patent Abstracts of Japan, vol. 2000, No. 26, Jul. 1, 2002 & JP 2001 243096 A (Sharp Corp), Sep. 7, 2001.

(Continued)

*Primary Examiner*—Thai Tran
*Assistant Examiner*—Hung Q Dang
(74) *Attorney, Agent, or Firm*—Frommer Lawrence & Haug LLP; William S. Frommer; Thomas F. Presson

(57) ABSTRACT

In a recording control apparatus and method, in recording areas on an optical disk, consecutive empty areas for an ALLOCATION_UNIT are reserved as reserved areas. Multiplexed data in units of packets which can be recorded in the reserved areas is recorded in the reserved areas. A remaining part of the reserved areas in which the multiplexed data in units of packets is not recorded is freed as empty areas. Subsequently, multiplexed data is similarly recorded.

21 Claims, 22 Drawing Sheets

| DATA SERIES | DATA HAVING REFERENCE ANNULUS SIZE | | | | DATA HAVING REFERENCE ANNULUS SIZE | | | | |
|---|---|---|---|---|---|---|---|---|---|
| | ALIGNMENT | | ALIGNMENT | | | | | ALIGNMENT | |
| ECC BLOCK | ECC BLOCK | ECC BLOCK | ECC BLOCK | ECC BLOCK | ECC BLOCK | ECC BLOCK | ECC BLOCK | ECC BLOCK | |
| DATA SERIES | DATA HAVING ACTUAL ANNULUS SIZE | | | | DATA HAVING ACTUAL ANNULUS SIZE | | | | |

FOREIGN PATENT DOCUMENTS

| | | |
|---|---|---|
| JP | 8 123731 | 5/1996 |
| JP | 8 273334 | 10/1996 |
| JP | 2000 30253 | 1/2000 |
| JP | 2000 260163 | 9/2000 |
| JP | 2001 22528 | 1/2001 |
| JP | 2001 43662 | 2/2001 |
| JP | 2001 202274 | 7/2001 |
| JP | 2001 243095 | 9/2001 |
| JP | 2001 243107 | 9/2001 |
| JP | 2002 157829 | 5/2002 |
| JP | 2002 251830 | 9/2002 |
| JP | 2002 252828 | 9/2002 |
| JP | 2002 260338 | 9/2002 |
| JP | 2002 281436 | 9/2002 |
| JP | 2003 6996 | 1/2003 |
| WO | WO 01 41143 | 6/2001 |

OTHER PUBLICATIONS

Patent Abstracts of Japan, vol. 2003, No. 03, May 5, 2003 & JP 2002 342132 A (Matsushita Electric Ind Co Ltd), Nov. 29, 2002.

* cited by examiner

FIG. 15D

| AS-SIGNED | A ANNULUS (1) | V ANNULUS (1) | A ANNULUS (2) | V ANNULUS (2) | RESERVED | UNASSIGNED |

LSN = 3200, LSN = 3328, LSN = 3584, LSN = 3712

576 LOGICAL SECTORS = 18 ECC BLOCKS

FIG. 15E

| AS-SIGNED | A ANNULUS (1) | V ANNULUS (1) | A ANNULUS (2) | V ANNULUS (2) | A ANNULUS (3) | RE-SERVED | UNASSIGNED |

LSN = 3200, LSN = 3328, LSN = 3584, LSN = 3712, LSN = 4000, LSN = 4128

FIG. 15F

| AS-SIGNED | A ANNULUS (1) | V ANNULUS (1) | A ANNULUS (2) | V ANNULUS (2) | A ANNULUS (3) | UNASSIGNED |

LSN = 3200, LSN = 3328, LSN = 3584, LSN = 3712, LSN = 4000, LSN = 4128

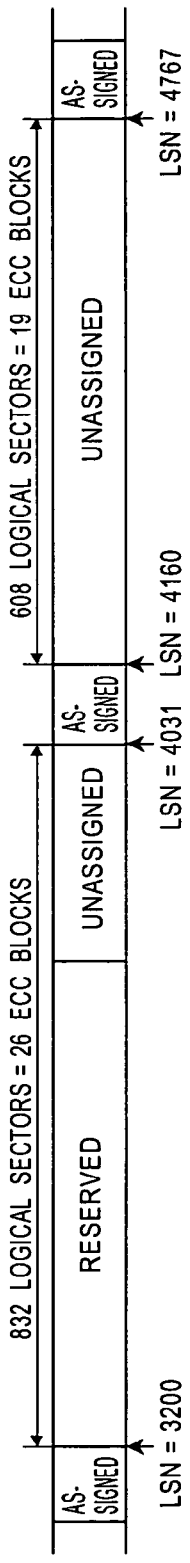
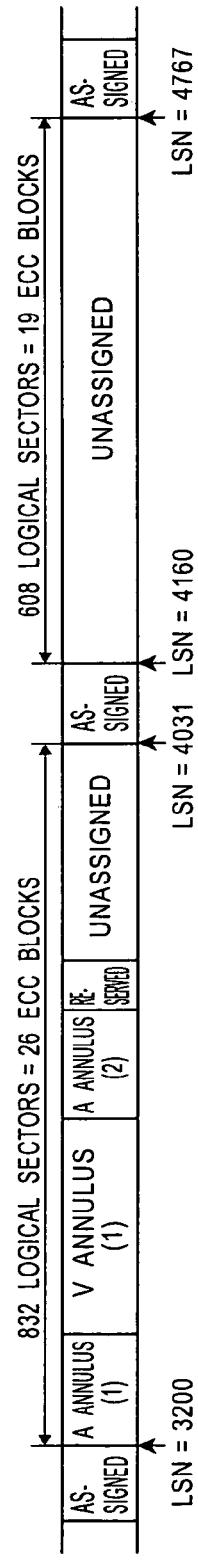
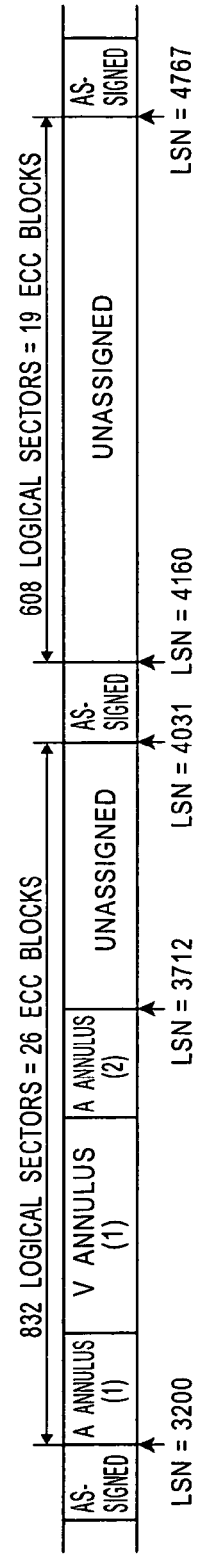

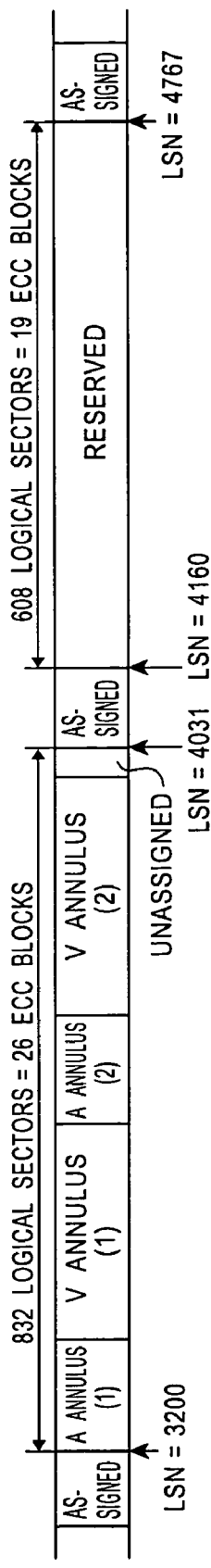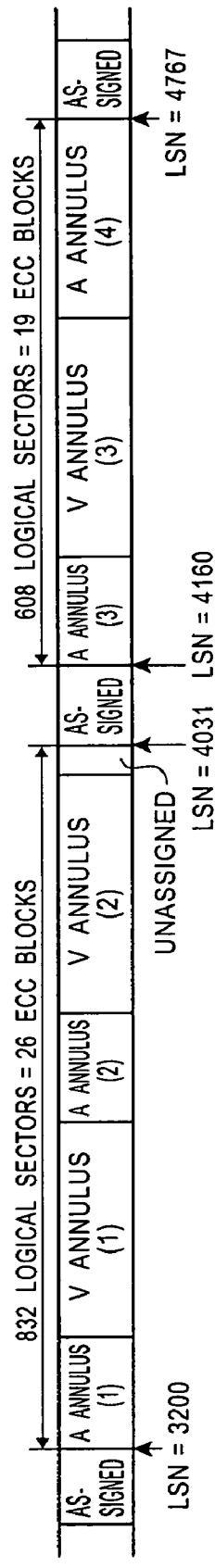

RECORDING CONTROL APPARATUS, RECORDING CONTROL METHOD, AND PROGRAM USED THEREWITH

BACKGROUND OF THE INVENTION

1. Field of the Invention

The present invention relates to recording control apparatuses, recording control methods, and programs used therewith, and in particular, to a recording control apparatus and method in which data is recorded so that a seeking frequency can be reduced, for example, in a mode of reading/writing data on a recording medium such as an optical disk, and a program used with the apparatus and method.

2. Description of the Related Art

In recent years, optical disks and other recording media for which recording and reading rates have greatly increased have come into practical use, and long-time recording of video data with relatively high picture quality has become possible.

Japanese Unexamined Patent Application Publication No. 11-136631 discloses a method in which high-resolution video data and low-resolution video data of identical pictures are recorded and video data having an optimal resolution is selected in accordance with the use, such as editing.

Even if the recording or reading rate is high, when a video data stream is recorded discontinuously, that is, in the form of divided pieces, seeking occurs at the discontinuous portions. When seeking causes reading of video data to be late when the video data must be played back, playback of the video data is interrupted.

SUMMARY OF THE INVENTION

The present invention is made in view of the above circumstances, and it is an object of the present invention to reduce a seeking frequency in a mode of reading/writing data on, for example, a recording medium such as an optical disk.

According to an aspect of the present invention, a recording control apparatus for controlling data recording on a recording medium is provided which includes an area-reserving unit for reserving, as reserved areas, predetermined-sized consecutive empty areas having a predetermined size from among recording areas on the recording medium, a recording control unit for controlling recording of data in units of packets in the reserved areas, and an area-freeing unit for freeing, as empty areas, a remaining part of the reserved areas in which the data in units of packets is not recorded.

According to another aspect of the present invention, a recording control method for controlling data recording on a recording medium is provided which includes the steps of reserving, as reserved areas, predetermined-sized consecutive empty areas having a predetermined size from among recording areas on the recording medium, controlling recording in the reserved areas of data which can be recorded in units of packets in the reserved area, and freeing, as empty areas, a remaining part of the reserved areas in which the data in units of packets is not recorded.

According to another aspect of the present invention, a program for allowing a computer to perform a recording control method for controlling data recording on a recording medium is provided. The recording control method includes the steps of reserving, as reserved areas, predetermined-sized consecutive empty areas having a predetermined size from among recording areas on the recording medium, controlling recording in the reserved areas of data which can be recorded units of packets in the reserved area, and freeing, as empty areas, a remaining part of the reserved areas in which the data in units of packets is not recorded.

BRIEF DESCRIPTION OF THE DRAWINGS

FIGS. 4A, 4B, and 4C are illustrations which show logical formats of data items recorded on the optical disk 3 shown in FIG. 3, and in which FIG. 4A shows frame-unit interleaving, FIG. 4B shows file-unit interleaving, and FIG. 4C shows annulus-unit interleaving;

FIGS. 15A to 15F are illustrations which show a case in which multiplexed data is written on the optical disk 3 in FIG. 1, and in which FIG. 15A shows reservation of consecutive empty areas, FIG. 15B shows allocation of annuli, FIG. 15C shows freeing of reserved empty areas, FIG. 15D shows reservation of consecutive empty areas, FIG. 15E shows allocation of annuli, and FIG. 15F shows freeing of reserved empty areas;

FIGS. 17A to 17F are illustration which show a case in which multiplexed data is written on the optical disk 3 in FIG. 1, and in which FIG. 17A shows consecutive empty areas, FIG. 17B shows allocation of annuli, FIG. 17C shows freeing of reserved empty areas, FIG. 17D shows reservation of consecutive empty areas, FIG. 17E shows allocation of annuli, and FIG. 17F shows freeing of reserved empty areas;

FIGS. 19A to 19E are illustrations which show a case in which multiplexed data is written on the optical disk 3 in FIG. 1, and in which FIG. 19A shows reservation of consecutive empty areas, FIG. 19B shows allocation of annuli, FIG. 19C shows freeing of reserved consecutive empty areas, FIG. 19D shows reservation of consecutive empty areas, and FIG. 19E shows allocation of annuli.

DESCRIPTION OF THE PREFERRED EMBODIMENTS

Figure 1:
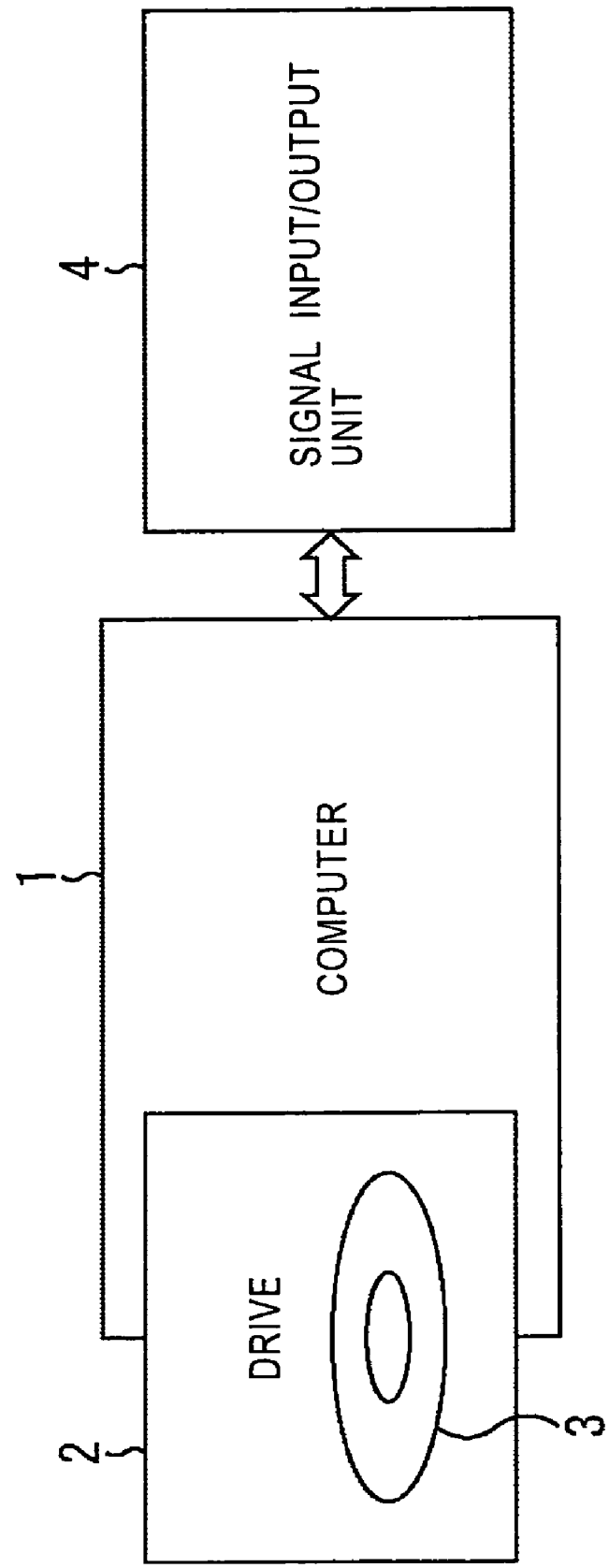
FIG. 1 is a block diagram showing an embodiment of a recording/playback system to which the present invention is applied.

FIG. 1 shows the configuration of an embodiment of a recording/playback system to which the present invention is applied.

The recording/playback system shown in FIG. 1 is formed based on a computer 1. The computer 1 includes a built-in drive 2 for reading/writing data on an optical disk 3, such as a CD-R (compact disc recordable), CD-RW (CD rewritable), or DVD-RAM (digital versatile disk random access memory) drive. The optical disk 3 can be easily loaded into the drive 2. Under the control of the computer 1, the drive 2 records (writes) data on the optical disk 3, and reads data from the optical disk 3.

In the embodiment in FIG. 1, a signal input/output unit 4 (including a videocassette recorder and a television tuner) which can output audio visual (AV) data such as picture data and audio data, and from which AV data can be input, if needed, is connected as an external unit to the computer 1. The computer 1 receives AV data output from the signal input/output unit 4 and supplies the storage unit 2 with the AV data so as to be recorded on the optical disk 3. Also, the computer 1 controls the drive 2 to read AV data recorded on the optical disk 3, and controls a built-in display unit and speaker to output the read AV data. Alternatively, the computer 1 controls, for example, the signal input/output unit 4 to perform recording of the AV data read from the optical disk 3, etc.

Figure 2:
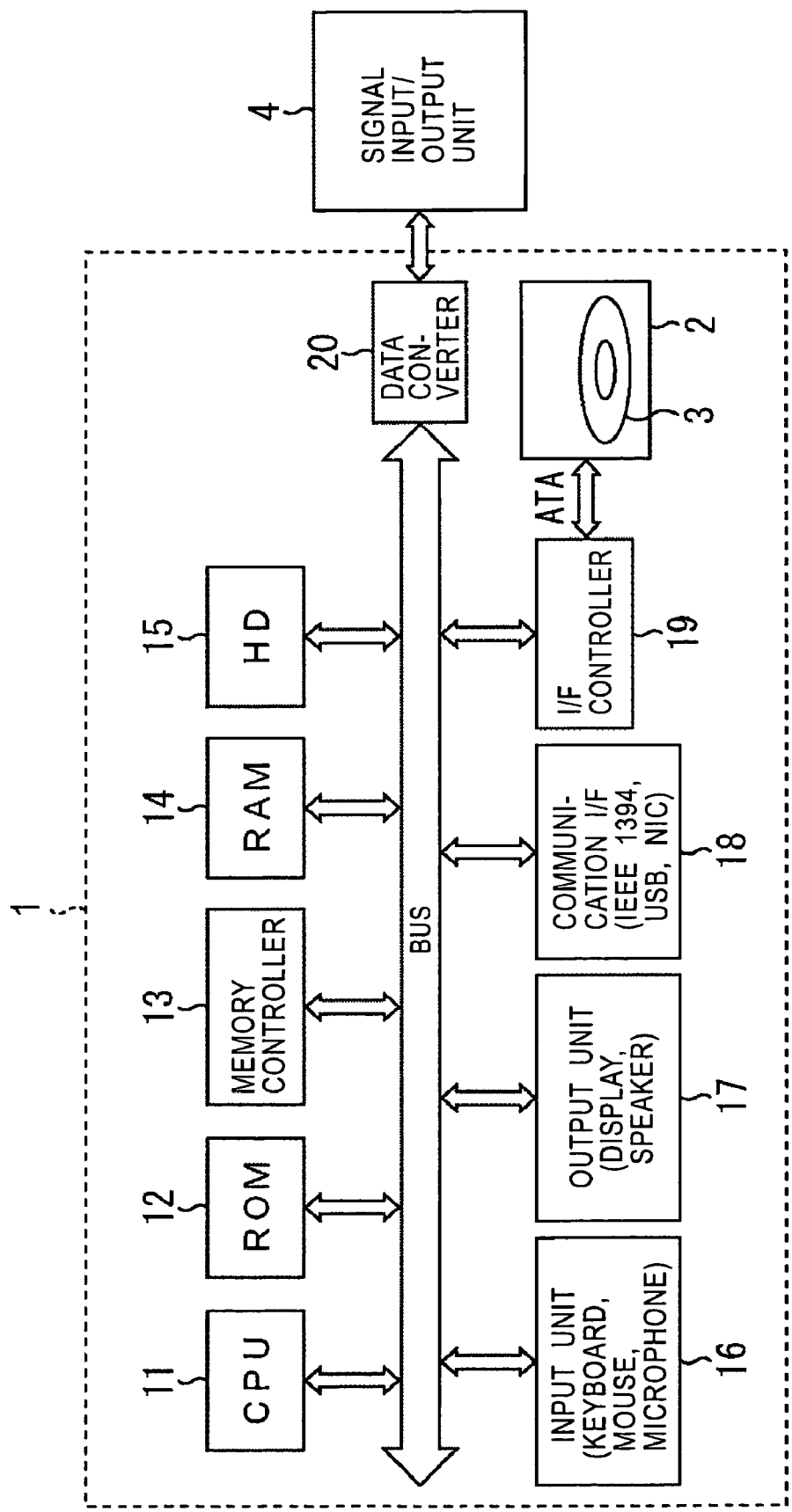
FIG. 2 is a block diagram showing the configuration of the computer 1 shown in FIG. 1.

FIG. 2 shows an example of the hardware configuration of the computer 1 shown in FIG. 1.

When a user operates an input unit 16 to input a command, a central processing unit (CPU) 11 executes a program stored in a read-only memory (ROM) 12 in response to the input command. Also, a program stored in a hard disk (HD) 15, a program installed in the HD 15 after being transferred from a satellite or a network, and being received by a communication interface (I/F) 18, or a program installed in the HD 15 after being read from a removable recording medium such as the optical disk 3 when it is loaded in the drive 2, is loaded into a random access memory (RAM) 14 and is executed by the CPU 11. This causes the CPU 11 to perform various processes in accordance with flowcharts (described later).

The ROM 12 stores, for example, an initial program loading (IPL) program, a basic input/output system (BIOS) program, and firmware. Instead of the ROM 12, an electrically erasable programmable ROM (EEPROM) may be employed. This case can cope with upgrading of the version of the firmware.

A memory controller 13 is formed by, for example, a direct memory access (DMA) controller, and controls reading and writing of data in the RAM 14. The RAM 14 temporarily stores a program executed by the CPU 11 and the data required for processing of the CPU 11. The HD 15 stores programs (including not only applications but also an operating system (OS)) installed into the computer 1, and the data required for processing of the CPU 11.

An input unit 16 is constituted by, for example, a keyboard, a mouse, a microphone, etc., and is operated by the user. The input unit 16 supplies the CPU 11 with a signal corresponding to an operation performed by the user. An output unit 17 is constituted by, for example, a display unit and a speaker, etc., and displays a supplied picture or outputs supplied audio. A communication interface (I/F) 18 is constituted by, for example, an IEEE (Institute of Electrical and Electronics Engineers) 1394 port, a USB (universal serial bus) port, a network interface card (NIC) for connecting to a local area network (LAN), etc., and performs communication control complying with each standard.

An interface (I/F) controller 19 functions as an interface for exchanging data with the drive 2 in accordance with, for example, a standard such as Advanced Technology Attachment (ATA).

A data converter 20 includes, for example, an MPEG (Moving Picture Experts Group) encoder/decoder. The data converter 20 performs MPEG-encoding on AV data supplied from the signal input/output unit 4, and outputs the resultant MPEG stream onto a bus of the computer 1. Also, the data converter 20 performs MPEG decoding on the MPEG stream output onto the bus of the computer 1, and outputs the resultant AV data to the bus of the computer 1 or supplies the resultant AV data to the signal input/output unit 4.

The above CPU 11 to data converter 20 are connected to one another by the bus of the computer 1.

In the computer 1 having the above-described configuration, the processes described later are performed such that the CPU 11 executes the programs installed into the computer 1.

In this case, the programs to be executed by the CPU 11 may be recorded beforehand in the HD 15 and the ROM 12, which are built-in recording media of the computer 1.

Alternatively, the programs may be temporarily or eternally stored (recorded) on removable recording media such as a flexible disk, a CD-ROM (compact disc read only memory), an MO (magneto-optical) disk, a DVD (digital versatile disk), a magnetic disk, and a semiconductor memory. The removable recording media can be provided as so-called "package software".

In addition to installation of each program from each removable recording medium into the computer 1, the program can be wirelessly transferred to the computer 1 by a digital broadcasting satellite, or can be transferred to the computer 1 by wire through a network such as the Internet, and the transferred program can be received by the communication I/F 18 and can be installed into the built-in HD 15.

Here, in this Specification, processing steps constituting a program for causing the computer 1 to perform a type of process do not always need to be executed in time series, but include steps (e.g., parallel processing or an object-based processing) which are executed in parallel or separately.

Processing for the program may be performed by a single CPU or may be performed in distributed processing by a plurality of CPUs. In addition, the program may be transferred and executed by a remote CPU.

Figure 3:
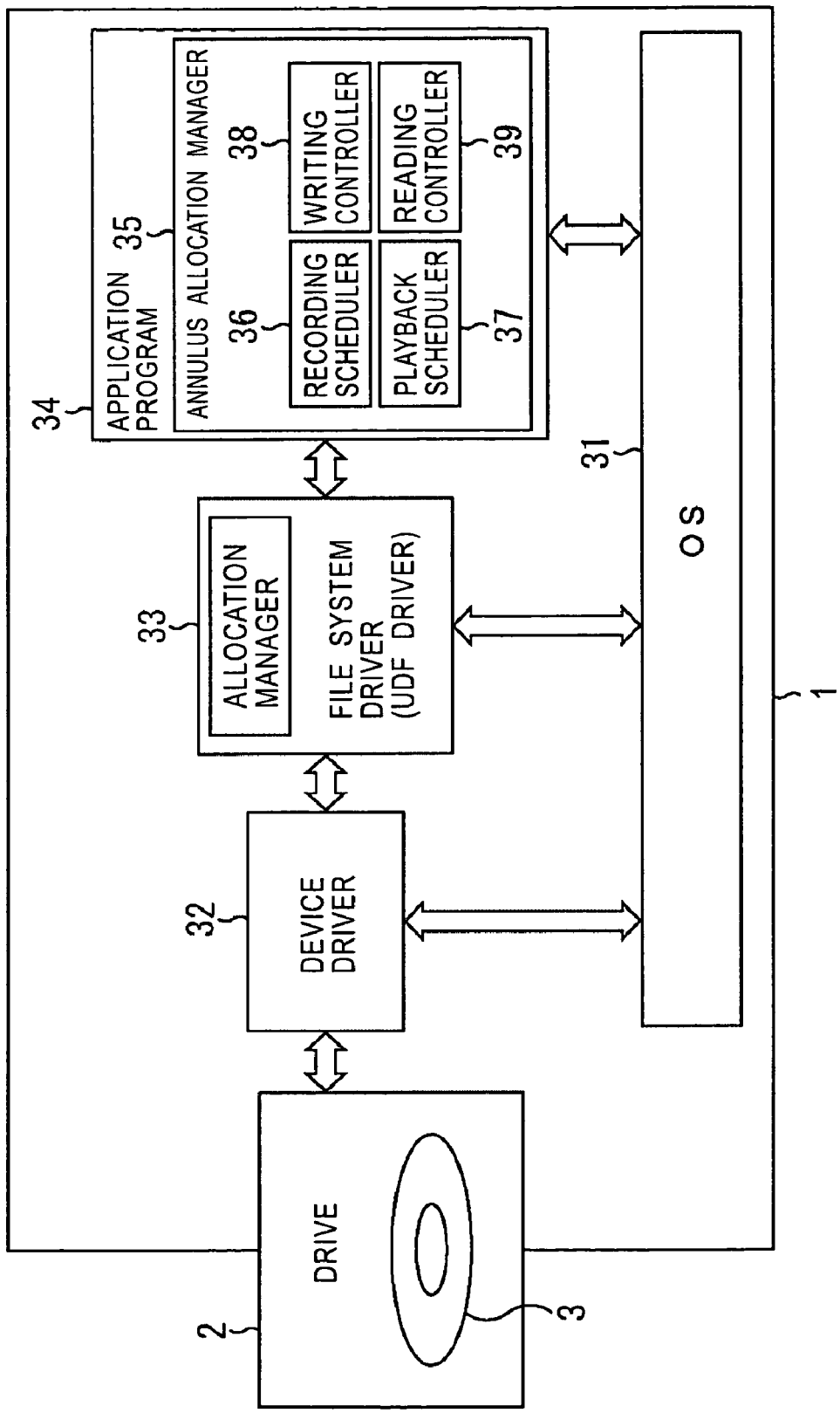
FIG. 3 is a block diagram showing software executed by the computer 1 in FIG. 1.

Next, FIG. 3 shows an example of a functional configuration realized such that the CPU 11 in FIG. 2 executes a program.

In the computer 1, under management of an OS 31, various application programs are executed. Also, under management of the OS 31, a file system driver 33 and a device driver 32 operate.

When reading/writing data on the optical disk 3 in a state loaded into the drive 2, an application program 34 records the data in the file system driver 33, or designates a file containing the data. The file system driver 33 designates, for the device driver 32, positional information of the designated file on the optical disk 3. The device driver 32 requests the drive 2 to read/write the data in a recording area on the optical disk 3 which is represented by the positional information from the file system driver 33.

In this embodiment, for example, the application program 34 has a built-in annulus allocation manager 35, and the annulus allocation manager 35 controls reading/writing of data on the optical disk 3 while controlling allocation of data on the optical disk 3.

As the application program 34 having the built-in annulus allocation manager 35, for example, so-called "writing software" or the like for reading/writing data on the optical disk 3 may be employed. Also, for example, a universal disk format (UDF) driver, employed as a file system driver for CDs-R/RW and DVDs, may be used as the file system driver 33.

In this embodiment, the UDF employed as the file system driver 33 has an allocation manager for managing the allocation of data (file) to the optical disk 3. The annulus allocation manager 35 cooperates with the allocation manager of the UDF to control (manage) the allocation on the optical disk 3 of annulus data as packets (described later).

The annulus allocation manager 35 includes a recording scheduler 36, a playback scheduler 37, a writing controller 38, and a reading controller 39. When recording of data on the optical disk 3 is requested by another application program (not shown) or a user's operation on the input unit 16, the recording scheduler 36 schedules order of recording (writing) the data on the optical disk 3. In response to the result of scheduling by the recording scheduler 36, the writing controller 38 requests the file system driver 33 to record the data on the optical disk 3. In response to the request from the writing controller 38, the file system driver 33 uses the device driver 32 and the drive 2 to write the data on the optical disk 3.

In this case, it is assumed that the drive 2 performs writing/reading of data on the optical disk 3, for example, from inner to outer circumference. Also, in the drive 2, a physical block (physical unit region) composed of at least one physical sector which is a minimum unit of accessing the optical disk 3 is used as a unit for performing error checking and correction (ECC) processing. Reading/writing of data is performed by the physical block. Physical block numbers are respectively assigned to the physical blocks, for example, from the inner to outer circumference of the optical disk 3, and logical blocks are respectively assigned to the physical blocks. However, reading/wring of data on the optical disk 3 can be performed from the outer to inner circumference of the optical disk 3. The number of physical sectors constituting each physical block is not particularly limited.

When receiving a data reading/writing request from the file system driver 33, the device driver 32 supplies the drive 2 with the reading/writing request, together with a logical block number (hereinafter referred to as an "LBN" if necessary) assigned to a logical block in which the reading/writing is performed. The drive 2 performs data reading/writing on a physical block on the optical disk 3 which is assigned to a logical block corresponding to the logical block number supplied from the device driver 32.

It is assumed that each logical block corresponding to each physical block has an assigned logical block number which is proportional to the physical block number of the physical block. In this case, when a plurality of logical blocks have consecutive logical block numbers, physical blocks corresponding to the logical blocks also have consecutive physical block numbers. As a result, the physical blocks serve as consecutive recording areas. In other words, when logical blocks are consecutive, physical blocks corresponding to the logical blocks are also consecutive.

As described above, writing/reading of data on the optical disk 3 is performed, for example, from the inner to outer circumference of the optical disk 3. Ascending physical block numbers are assigned to the physical blocks from the inner to outer circumference of the optical disk 3, and logical block numbers proportional to the physical block numbers are assigned to the logical blocks. Therefore, writing/reading of data on the optical disk 3 is performed in ascending order of numbers both in the case of using the physical block numbers and in the case of using the logical block numbers.

When reading of data from the optical disk 3 is requested by another application (not shown) or a user's operation on the input unit 16, the playback scheduler 37 schedules order of reading the data from the optical disk 3. In response to the result of scheduling by the playback scheduler 37, the reading controller 39 requests the file system driver 33 to read the data from the optical disk 3. In response to the request from the reading controller 39, the file system driver 33 uses the device driver 32 and the drive 2 to read the data from the optical disk 3.

Figure 4A:
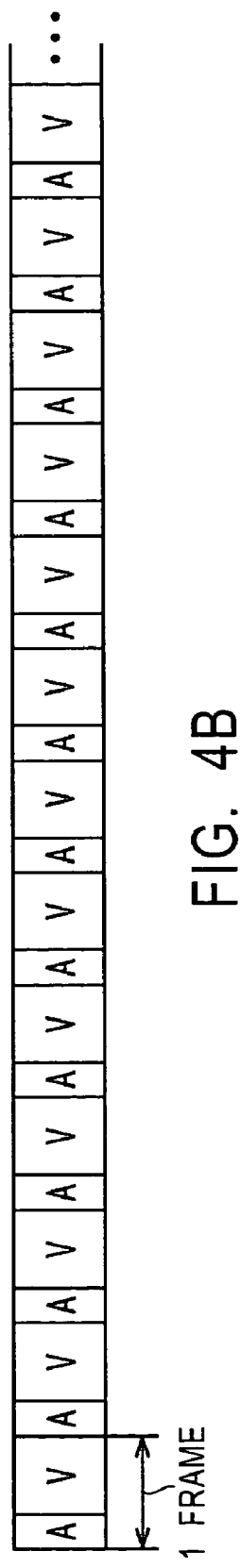
Figure 4B:
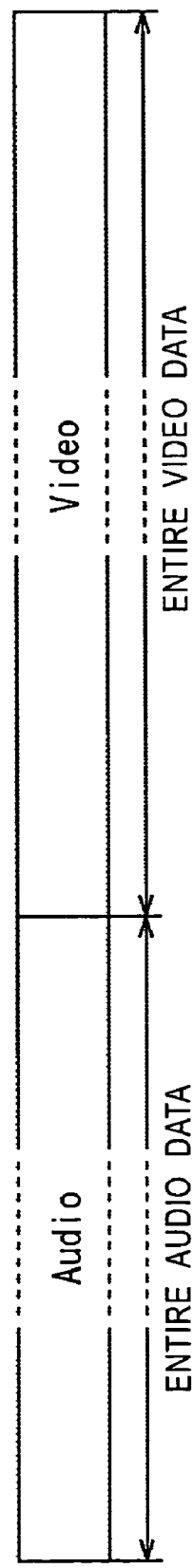
Figure 4C:
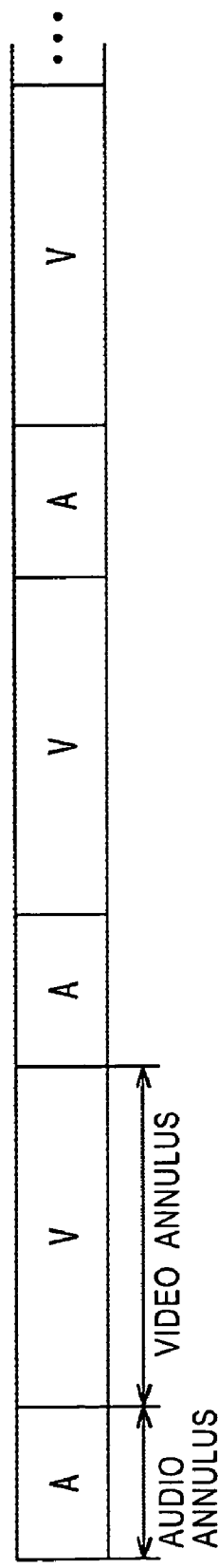

Next, FIGS. 4A to 4C show recording methods in the case of recording a plurality of related data series on the optical disk 3.

In FIGS. 4A to 4C, as the related data series, for example, a video data series and an audio data series associated therewith are employed.

In FIG. 4A, video item V in one frame and audio item A associated with the video item in the one frame are alternately allocated. This recording method is hereinafter also referred to as the "frame-unit interleave method".

In FIG. 4B, the entirety of a video data series and the entirety of an audio data series are separately allocated as separate files. This recording method is hereinafter also referred to as the "non-interleave method".

In FIG. 4C, video data item V whose size exceeds a 1-frame size and does not reach the entire size of a video-data series, and audio data A whose size exceeds a 1-frame size and does not reach the entire size of an audio data series are alternately allocated.

In the case of data recording from the inner to outer circumference (or the reverse direction) of the optical disk 3 so that video data item V whose size exceeds a 1-frame size and does not reach the entire size of a video data series, and audio data A whose size exceeds a 1-frame size and does not reach the entire size of an audio data series are alternately allocated, by giving, for example, different tones or different colors to video-data-recorded portions and audio-data-recorded portions, the video-data-recorded portions and the audio-data-recorded portions look as if both were annual rings or annuli formed on a cross-section (cut end) of a tree trunk. Accordingly, data such as video data item or audio data item whose size exceeds a 1-frame size and does not reach the entire size of a data series is hereinafter also referred to as an "annulus data item". Also, as shown in FIG. 4C, a recording method for recording a plurality of data series so that a video data series and an audio data series are cyclically allocated in units of annulus data items is hereinafter also referred to as an "annulus-unit interleave method".

In the frame-unit interleave method, video data item V and audio data item A in one frame are alternately written on the optical disk 3. Thus, the writing can be performed if there is a buffer that can buffer at least the amount of video data item V and audio data item A in one frame. Since one that can store the amount of video data or audio data in one frame is enough as the buffer, also a delay (recording delay) caused by buffering of video data or audio data by the buffer can be reduced.

In the frame-unit interleave method, sets of video data item V and audio data item A in one frame are alternately recorded. Accordingly, even in the case of so-called "audio video split editing" in which either of video data and audio data is edited, both the video data and the audio data must be read, thus making it difficult to perform efficient data reading from the optical disk 3.

Specifically, for example, in the case of editing only video data, only the video data may be read. However, in the case of reading data from the optical disk 3, which contains data recorded in the frame-unit interleave method, After a video data item in one frame is read, and seeking up to the recording position of a video data item in the next frame is subsequently performed, the reading must be repeated. In the frame-unit interleave method, what is recorded from the recording position of a video data item in one frame to the recording position of a video data item in the next frame is an audio data item in one frame. By comparing the reading time required to read the audio data item, which has such a small amount, and a seeking time for performing seeking for skipping over the audio data item, it is found that, in general, the reading time is less than the seeking time. Accordingly, by skipping over both the video data and the audio data rather than reading only the video data, the time required to read the entirety is smaller. However, it hardly be said that reading of the audio data, which is not to be edited, is efficient.

In the non-interleave method shown in FIG. 4B, the entire video data series and the entire audio data series are separately allocated and recorded on the optical disk 3. Thus, in the case of performing AV split editing, only one to be edited between the video data and the audio data can be efficiently read.

However, in the non-interleave method, the entire video data series and the entire audio data series are separately allocated and recorded on the optical disk 3, that is, the recording areas of the optical disk 3 are divided into a set of video areas and a set of audio areas, and the video data is recorded in the video areas and the audio data is recorded in the audio areas. Thus, in the case of consecutively writing data on the optical disk 3 from the inner to outer circumference, an extremely-large-size buffer that can buffer the entire video data series and the entire audio data series is required. In addition, also a delay (recording delay) caused by buffering of the video data or the audio data by the extremely-large-size buffer is greatly increased.

Accordingly, in the non-interleave method, there is a technique in which writing of video data in the video areas of the optical disk 3 and writing of audio data in the audio areas are alternately performed in a time-sharing manner.

In this case, seeking in which a pickup (not shown) of the drive 2 moves from one video area to one audio area, and seeking in which the pickup reversely moves frequently occur, thus greatly reducing the effective recording rate. Moreover, when the recording/playback system in FIG. 1 is employed for use in a camcorder, a seeking operation must be avoided in an impact-resistant viewpoint.

Accordingly, in the annulus-unit interleave method, the video data item V and the audio data item A are recorded so as to be alternately allocated in units of annulus data items.

The size of each annulus data item exceeds the size of one frame and does not reach the entire size of each data series, as described above. However, it is preferable in implementation that the size of the annulus data item satisfy the following first and second conditions.

Specifically, the first condition is that, in the comparison between the time required to read an annulus data item from the optical disk 3 and the seeking time required to perform seeking for skipping over the recording area of the annulus data item, the seeking time is less than the reading time. In other words, in a case in which reading is faster than skipping over the annulus data item, the case does not differ from the case of employing the frame-unit interleave method (FIG. 4A). Thus, it is required that skipping-over be faster than reading of the annulus data item. Preferably, the seeking time is sufficiently less than the reading time.

In the second condition, it is required that the size of the annulus data item be a size enabling the existence of a buffer having an actual size for buffering the annulus data item. In other words, since the annulus-unit interleave method alternately records video data item V and audio data item A in units of annulus data items, at least a buffer for buffering video data or audio data in units of annulus data items is required for recording. Therefore, if there is an actual buffer that can buffer video data or audio data in units of annulus data items, data recording cannot be performed by the annulus-unit interleave method. Thus, in the second condition, it is required that there be a buffer having an actual size for buffering the annulus data.

While the buffer is buffering an annulus data item, the annulus data item being buffered cannot be recorded on the optical disk 3, and the buffering of the annulus data item in the buffer causes a delay (recording delay). This delay time corresponds to the size of the annulus data item stored in the buffer, that is, a buffer size. Accordingly, for example, in system design, when the delay time, caused by the buffering of the annulus data item in the buffer, is limited, the buffer size must be such that the delay time caused by the buffering of the annulus data item in the buffer is within the limited time.

The first condition requires the size of the annulus data item to be preferably large, but the second condition requires the size of the annulus data item to be preferably small. Thus, the first and second conditions are opposed to each other.

In order to satisfy the first condition that the seeking time required to perform seeking for skipping over the annulus data item is less than the reading time required to read the annulus data item, it is required that, in general, the annulus data item be recorded on a plurality of tracks, that is, the size of the annulus data item is larger than the size of one track on the optical disk 3. In order that the seeking time on the annulus data item may be sufficiently less than the reading time, in general, the size of the annulus data item must be the size of several tracks on the optical disk 3. The size of one track is approximately several hundred kilo bytes (KB), depending on the radius position of the track.

Next, regarding the second condition that there is a buffer having the actual size for buffering the annulus data, the upper limit of the actual size of the buffer is, for example, approximately tens of megabytes (MB) for the present.

Accordingly, the proper size of the annulus data is approximately several hundred MB to tens of MB although it is a rough value. This size roughly corresponds to approximately several tens of tracks on the optical disk 3. A state of the recording areas of the optical disk 3 in which video data and audio data are alternately recorded as a plurality of data series resembles annuli. Accordingly, data having the size is called "annulus data", as described above.

Although, in the above case, video data and audio data are employed as related data series to be recorded on the optical disk 3, data other than the video data and audio data, and other data in addition to the video data and audio data may be employed as the plurality of data series.

Also, the annulus-unit interleave method may be employed even in the case of recording not a plurality of data series but one data series on the optical disk 3. This annulus-unit recording method is disclosed in Japanese Patent Application No. 2002-104496 and its corresponding U.S. patent application Ser. No. 10/407,064 filed on Apr. 3, 2003 which is entitled "RECORDING CONTROL APPARATUS AND METHOD, AND PROGRAM AND RECORDING MEDIUM USED THEREWITH" and which has been assigned to the assignee of the present United States Patent Application.

Figure 5:
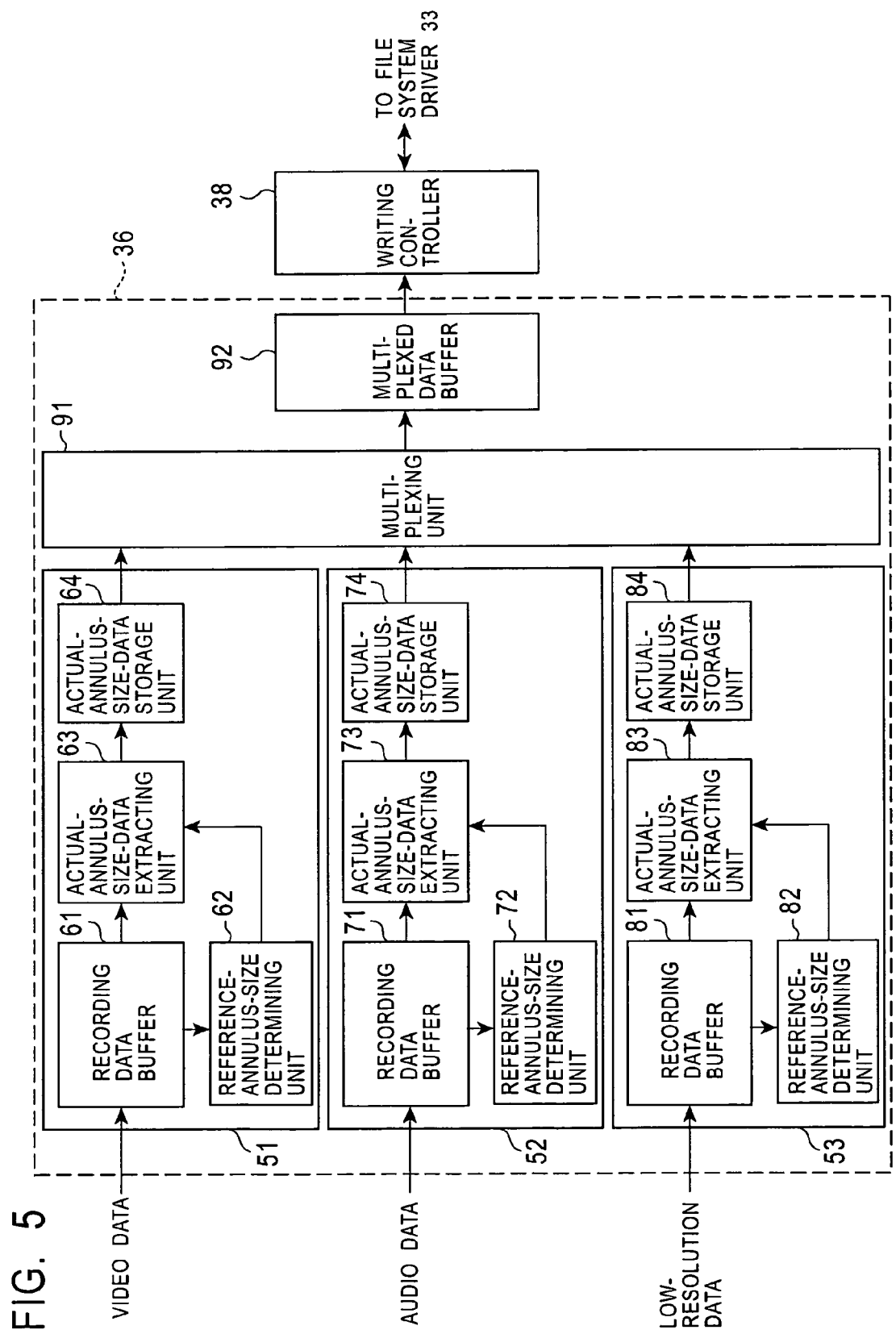
FIG. 5 is a block diagram showing the functional configuration of the recording scheduler 36 shown in FIG. 3.

Next, FIG. 5 shows the configuration of the recording scheduler 36 in FIG. 3.

The recording scheduler 36 shown in FIG. 5 employs three types of data as a plurality of related data series to be recorded on the optical disk 3, for example, video data, audio data associated with the video data, and low-resolution data obtained by reducing the resolution of the video data.

In other words, the recording scheduler 36 includes packetization units 51, 52, and 53 for packetizing the video data, the audio data, and the low-resolution data into annulus data.

The recording scheduler 36 can be supplied with the video data, the audio data associated with the video data, and the low-resolution data in which the resolution of the video data is reduced. Each of the video data and the low-resolution data is obtained such that the data converter 20 converts video data supplied from the signal input/output unit 4, and the audio data is obtained such that the data converter 20 converts audio data supplied from the signal input/output unit 4.

As the video data supplied to the recording scheduler 36, video data, obtained such that, for example, all the frames of (baseband) video data supplied from the signal input/output unit 4 to the data converter 20 are treated as intra (I) pictures and are MPEG-encoded, may be employed.

As the audio data supplied to the recording scheduler 36, audio data, obtained such that, for example, (baseband) audio data supplied from the signal input/output unit 4 to the data converter 20 is MPEG-encoded. As the low-resolution data supplied to the recording scheduler 36, video data may be employed which is obtained by MPEG-encoding on video data generated such that, by reducing the number of pixels of (baseband) video data supplied from the signal input/output unit 4 to the data converter 20, the number of bits assigned to each pixel, and a frame rate, the spatial resolution (number of pixels) of the video data, a resolution in level (the number of bits assigned to each pixel), and a resolution in time domain (frame rate) decrease.

Here, the video data or the audio data supplied to the recording scheduler 36 is originally data to be provided to a user, and is hereinafter referred to as the "main video data" or "main audio data", if necessary. Both the main video data and the main audio data are collectively referred to as "main data", if necessary.

The low-resolution data can include, for example, data obtained by temporally sampling the main audio data, and data obtained by reducing the number of bits assigned to each of the samples. In other words, the low-resolution data can include, not only data in which the amount of the main video data is reduced, but also data in which the amount of the main audio data is reduced. When the low-resolution data is constituted by data obtained by reducing the amounts of the main video data and the main audio data, one in which, for example, main video data and main audio data which have reduced amounts are alternately allocated for one frame may be employed.

In FIG. 5, the packetization unit 51 can be supplied with the main video data. The packetization unit 51 packetizes the main video data into annulus-unit packets.

In other words, the main video data supplied to the packetization unit 51 is input to a recording data buffer 61. The recording data buffer 61 buffers the input main video data. The recording data buffer 61 supplies a reference-annulus-size determining unit 62 with the amount of data of the buffered main video data.

The reference-annulus-size determining unit 62 determines whether the amount of the main video data in the recording data buffer 61 is equal to or greater than a preset size of annulus data. The reference-annulus-size determining unit 62 supplies the result of determination to the an actual-annulus-size-data extracting unit 63.

The preset size of annulus data is hereinafter referred to as the "reference annulus size", if needed.

After receiving, from the reference-annulus-size determining unit 62, the result of determination indicating that the amount of the main video data in the recording data buffer 61 is equal to or greater than the reference annulus size, the actual-annulus-size-data extracting unit 63 reads and extracts main video data having an actual annulus size from the main video data stored in the recording data buffer 61, and supplies an actual-annulus-size-data storage unit 64 with the extracted data as a set of data items, that is, a packet. The video data having the actual annulus size which is extracted from the recording data buffer 61 by the actual-annulus-size-data extracting unit 63 has an actual annulus size of data from the oldest main video data stored in the recording data buffer 61.

The actual-annulus-size-data storage unit 64 temporarily stores the main video data having the actual annulus size which is supplied from the actual-annulus-size-data extracting unit 63.

The packetization unit 52 includes a recording data buffer 71 to an actual-annulus-size-data storage unit 74 which are similar in configuration to the recording data buffer 61 to the actual-annulus-size-data storage unit 64. The packetization unit 52 can be supplied with main audio data. Accordingly, the packetization unit 52 processes not the main video data but the main audio data similarly to the packetization unit 51. This forms a main audio data series supplied to the packetization unit 52 into packets of the main audio data having the actual annulus size.

Also a packetization unit 53 includes a recording data buffer 81 to an actual-annulus-size-data storage unit 84 which are similar in configuration to the recording data buffer 61 to the actual-annulus-size-data storage unit 64. The packetization unit 53 can be supplied with low-resolution data. Accordingly, the packetization unit 53 processes not the main video data but the low-resolution data similarly to the packetization unit 51. This forms a low-resolution data series supplied from the packetization unit 52 into packets of low-resolution data having the actual annulus size.

A multiplexing unit 91 multiplexes the main video data having the actual annulus size, main audio data, and low-resolution data which have the actual annulus size and which are respectively stored in the actual-annulus-size-data storage units 64, 74, and 84. The multiplexing unit 91 supplies the resultant multiplexed data as a data stream to a multiplexed data buffer 92.

The multiplexed data buffer 92 temporarily stores the multiplexed data supplied from the multiplexing unit 91. The multiplexed data stored in the multiplexed data buffer 92 is read by the writing controller 38, if necessary, and is written on the optical disk 3 by using the file system driver 33, the device driver 32, and the drive 2.

As described above, in the recording scheduler 36, each of main video data, main audio data, and low-resolution data series is formed into each packet having the actual annulus size, and the packets are multiplexed. When the actual annulus size is the same amount of data in all the data series, in the multiplexed data, for example, main audio data associated with main video data in a frame of interest, and low-resolution data obtained by reducing the resolution of the frame of interest are allocated at positions greatly remote from the position of the main video data in the frame of interest.

When, in the multiplexed data, main audio data associated with main video data in a frame of interest, and low-resolution data obtained by reducing the resolution of the frame of interest are allocated at positions greatly remote from the position of the main video data in the frame of interest, the main video data and the main audio data are recorded at greatly remote positions also on the optical disk 3. When the main video data in the frame of interest and the main audio data associated with the main video data are recorded at greatly remote positions on the optical disk 3, for playing back the frame of interest, large seeking occurs when the main video data in the frame of interest and the main audio data are read, and there is a possibility that real-time playback may be difficult.

For brevity of description, the main video data and the main audio data are noted. When, since the main video data and the main audio data differ in data rate, the actual annulus size is defined by the amount of data such as the number of bits or the number of bytes, and each of the main video data and the main audio data is packetized in the actual annulus size, which is the same number of bytes, and is multiplexed, in the multiplexed data, main video data in each frame and main audio data in the frame become shifted, and are gradually allocated at greatly remote positions. Recording the above multiplexed data on the optical disk 3 allocates the main video data in each frame and the main audio data in the frame at greatly remote position. As a result, large seeking occurs in order to read the main video data in the frame and the audio data in the frame, thus causing a possibility that real-time playback may be difficult.

Therefore, it is preferable that, in the multiplexed data, main video data in each frame and main audio data in the frame be allocated at close positions.

Preferable allocation of main video data in each frame and main audio data in the frame in the multiplexed data at close positions is realized by, for example, defining the reference annulus size by using a presentation time.

When the reference annulus size is called the "reference annulus period", the reference annulus period can be set to, for example, approximately 1.5 seconds to 2 seconds. A reference annulus size [bits] can be found based on the data rate [bps (bit per seconds)] of data to be packetized (into annulus data) by the reference annulus size and a reference annulus period [seconds] by the following expression:

Reference Annulus Size=Data Rate×Reference Annulus Period

The reference annulus period is a fixed value since it is a predetermined numeric value. The above expression indicates that, when the data rate is not constant (when data to be packetized by the reference annulus size is variable-rate data), also the reference annulus size changes in accordance with a change in the data rate.

By using the above expression to define the reference annulus size, main video data and main audio data in the same frame which are played back at the same presentation (display) time are allocated at close positions.

Reading/writing of data on the optical disk 3 is performed in units of physical blocks in which ECC processing is performed, as described above.

The reference annulus size is not always an integer multiple of the size of one physical block (hereinafter referred to as an "ECC block" if necessary) in which ECC processing is performed. Thus, even if annulus data having the reference annulus size is written from the start of an ECC block on the optical disk 3, a position at which the last sample of the annulus data is written does not always agree with an ECC block boundary.

However, when the main video data and main audio data formed into annulus data (packet) are referred to as the "video annulus" and the "audio annulus", respectively, and in the multiplexed data, the video annulus and the audio annulus are alternately allocated, the file system driver 33 regards adjacent video and audio annuli in the multiplexed data recorded on the optical disk 3 as belonging to another file. Therefore, for example, in view of the case of reading only (a file of) main audio data and the case of deleting (a file of) main audio data, it is preferable that an annulus-data boundary agree with an ECC block boundary.

Accordingly, the packetization unit 51 in FIG. 5 packetizes the main video data to generate annulus data so that the annulus-data boundary can agree with the ECC block boundary. In other words, the packetization unit 51 packetizes the main video data to generate annulus data having a size by which alignment is established with the ECC block.

Specifically, when the reference-annulus-size determining unit 62 in the packetization unit 51 determines that the amount of the main video data in the recording data buffer 61 is equal to or greater than the reference annulus size, the actual-annu-lus-size-data extracting unit 63 extracts, from the main video data stored in the recording data buffer 61, a main video data item having a size by which alignment is established with the ECC block and which is closest to the reference annulus size.

Here, the size by which alignment is established with the ECC block and which is closest to the reference annulus size is an actual annulus size, and the actual-annulus-size-data extracting unit 63 extracts, from the main video data stored in the recording data buffer 61, a main video data item having an actual annulus size, whereby the main video data series is packetized into packets of annulus data having the actual annulus size.

Extraction of a main video data item having an actual annulus size from the main video data stored in the recording data buffer 61 includes the following two methods.

Since the actual annulus size is one in which alignment is established with the ECC bloc and is closest to the reference annulus size, extraction of the main video data item having the actual annulus size from the main video data stored in the recording data buffer 61 includes a first method in which a main video data item having the maximum size by which alignment is established with the ECC block and which is not greater than the reference annulus size is extracted from the recording data buffer 61, and a second method in which a main video data item having the minimum size by which alignment is established with the ECC block and which is not less than the reference annulus size is extracted from the recording data buffer 61.

Figure 6:
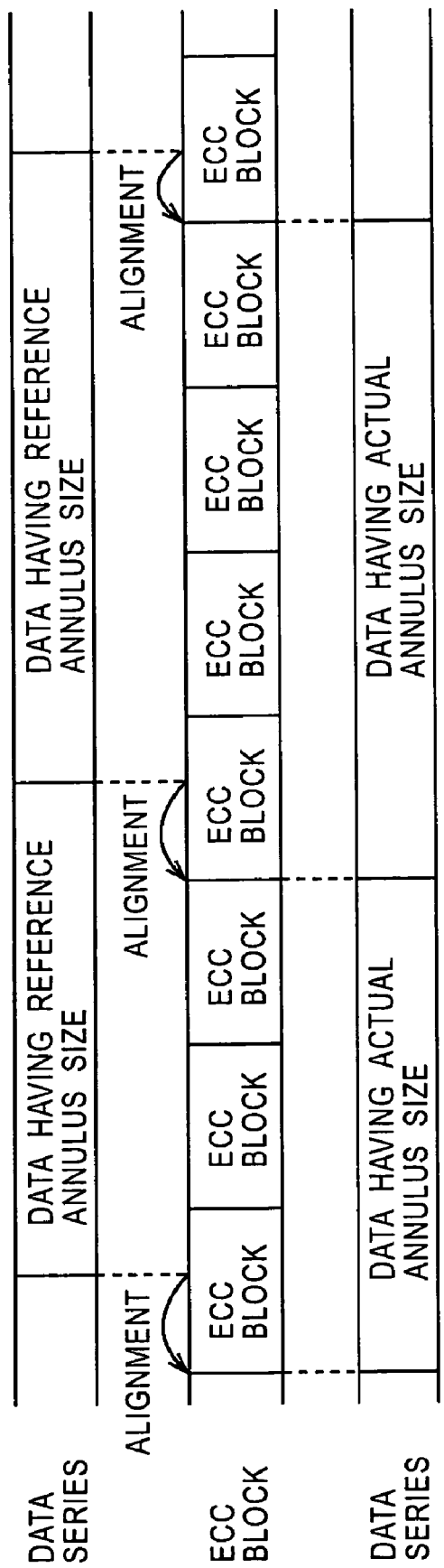
FIG. 6 is an illustration of a method for establishing alignment with ECC blocks.

According to the first method, as FIG. 6 shows, an ECC block boundary just before main video data having the reference annulus size is used as a boundary of main video data having the actual annulus size. According to the second method, an ECC block boundary just after main video data having the reference annulus size is used as a boundary of main video data having the actual annulus size.

Either of the first method and the second method may be used as extraction of the main video data having the actual annulus size from the main video data stored in the recording data buffer 61. When the second method is employed, the main video data having the actual annulus size may not be stored although the main video data having the reference annulus size is stored in the recording data buffer 61. Thus, after the main video data having the reference annulus size is stored in the recording data buffer 61, until the main video data having the actual annulus size is stored, there may be a case in which extraction of the main video data having the reference annulus size by the actual-tree-ring-size-data extracting unit 63 must be awaited.

Conversely, when the first method is employed, if the main video data having the reference annulus size is stored in the recording data buffer 61, the main video data having the actual annulus size is always stored. Thus, after the main video data having the reference annulus size is stored in the recording data buffer 61, the main video data having the actual annulus size can be immediately extracted by the actual-annulus-size-data extracting unit 63.

Accordingly, the first method is employed as the extraction of the main video data item having the actual annulus size from the main video data stored in the recording data buffer 61.

The actual annulus size is an integer multiple of the ECC block size.

Also, a relationship in size between the actual annulus size and the reference annulus size is not guaranteed. In other words, although, by establishing alignment with the ECC block, the front and rear boundaries of annulus data are moved so as to agree with ECC block boundaries, as shown in FIG. 6, a movement of the front boundary of the annulus data is not always equal to a movement of the rear boundary of the annulus data. A magnitude relationship between both movements determines the relation in size between the actual annulus size and the reference annulus size.

Moreover, according to the annulus data having the reference annulus size, playback within a reference annulus period, that is, presentation for predetermined presentation time, can be performed. In the case of using the annulus data having the actual annulus size, playback for presentation time close to the reference annulus period is performed. In other words, since the reference annulus size is one in which alignment is established with the ECC block, the presentation time of the annulus data having the actual annulus size is not basically constant. The presentation duration (hereinafter referred to as the "actual annulus period", if needed) of the annulus data having the actual annulus size is represented based on the data rate of the annulus data by the following expression:

Actual Annulus Period=Actual Annuls Size/Data Rate

Next, an annulus packetization process in which the packetization unit 51 shown in FIG. 5 packetizes main video data into annulus data items each having the reference annulus size is described below with reference to FIG. 7.

Figure 7:
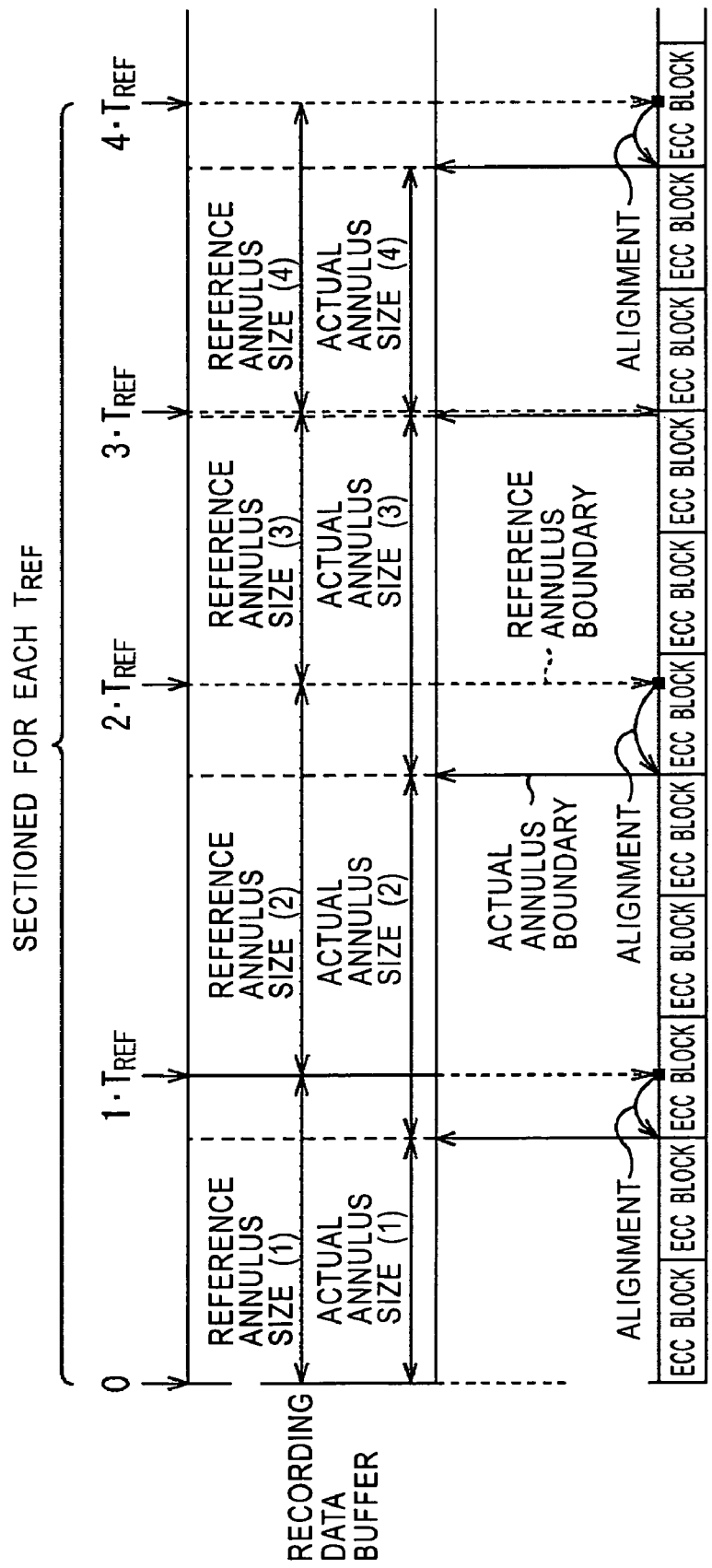
FIG. 7 is an illustration of annulus packetization.

In FIG. 7, the horizontal axis indicates the accumulated amount (total amount) of the main video data stored in the recording data buffer 61.

The reference-annulus-size determining unit 62 determines the amount of data in the recording data buffer 61 for each reference annulus period $T_{REF}$, that is, at times represented by $1 \times T_{REF}$, $2 \times T_{REF}$, $3 \times T_{REF}$, ..., and determines a storage position at which the last sample of the data is stored is a boundary (hereinafter also referred to as a "reference annulus boundary", if needed) of annulus data having the reference annulus size. The amount of data which is stored in the recording data buffer 61 for each reference annulus period $T_{REF}$ is the reference annulus size.

In the example shown in FIG. 7, the main video data has a variable rate. Accordingly, intervals between reference annulus boundaries are not constant. When the main video data has a fixed rate, the intervals between reference annulus boundaries are constant.

The actual-annulus-size-data extracting unit 63 moves a reference annulus boundary so that the reference annulus boundary can agree with a boundary of the ECC block closest to the reference annulus boundary in its left direction (direction in which the amount of data is less), and uses, as an actual annulus boundary (boundary of actual annulus data), the reference annulus boundary moved so as to move the ECC block boundary. The actual-annulus-size-data extracting unit 63 uses actual annulus boundaries to section the main video data stored in the recording data buffer 61, and extracts, as a packet of annulus data having the actual annulus size, main video data from one actual annulus boundary to the next actual annulus boundary.

Figure 8:
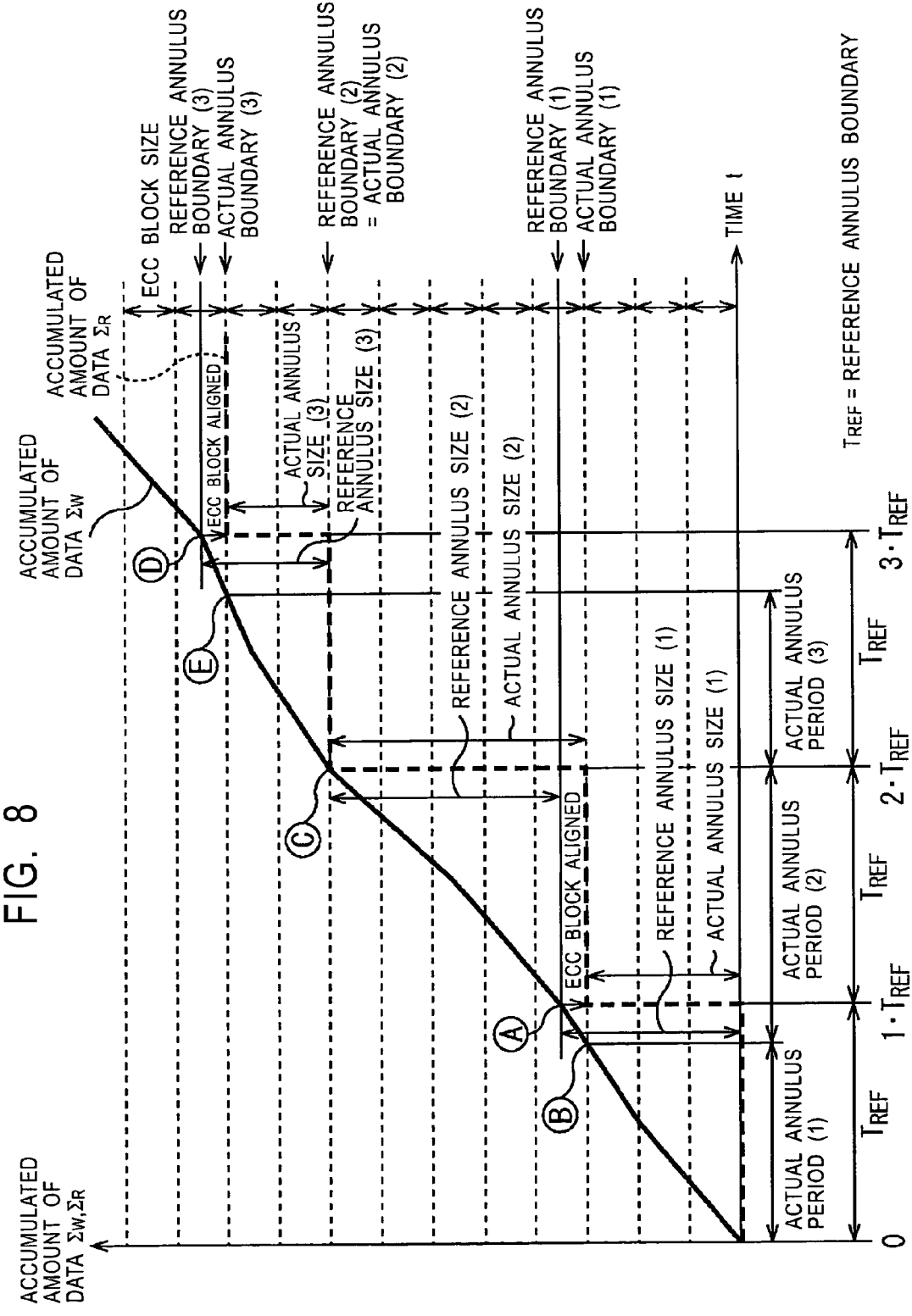
FIG. 8 is a graph showing the accumulated amount of main video data stored in the recording data buffer 61 shown in FIG. 5 and the accumulated amount of main video data extracted from the recording data buffer 61 in FIG. 5.

FIG. 8 shows the accumulated amount of main video data which is read/written in the recording data buffer 61.

In FIG. 8, the horizontal axis indicates time, and the vertical axis indicates the accumulated amount of the main video data.

In FIG. 8, the accumulated amount of the main video data, represented by $\Sigma_W$, is indicated by the solid line, and the gradient of the solid line indicating the accumulated amount $\Sigma_W$ of the main video data represents the data rate of the main video data supplied to the recording data buffer 61. Since the data rate of the main video data is set to be variable, as described above, also the gradient of the solid line indicating the accumulated amount $\Sigma_W$ changes. However, when the data rate of the main video data is fixed, the gradient of the solid line indicating the accumulated amount $\Sigma_W$ is constant. In other words, the accumulated amount $\Sigma_W$ in FIG. 8 can be indicated by a straight line.

Also, in FIG. 8, the accumulated amount $\Sigma_R$ of main video data that is read as packets of the annulus data having the actual annulus size from the recording data buffer 61 by the actual-annulus-size-data extracting unit 63 is indicated by the broken line.

Assuming that supply of the main video data to the recording data buffer 61 is started at a time point where time t is zero, the main video data is subsequently stored in the recording data buffer 61. In addition, as described above, in the case of representing the reference annulus period [seconds] by $T_{REF}$, when time t is $1 \times T_{REF}$, the actual-annulus-size-data extracting unit 63 extracts, from the main video data stored in the recording data buffer 61, a packet of annulus data having the first actual annulus size.

In other words, when a crossing at which the vertical line obtained when time t is $1 \times T_{REF}$ crosses the solid line indicating the accumulated amount $\Sigma_W$ of the main video data is denoted by point A, a horizontal line passing on point A is the first reference annulus boundary (1) of an annulus data packet. In the example shown in FIG. 8, since the reference annulus boundary (1) does not agree with an ECC block boundary, alignment with the ECC block is established in a direction in which the size of the annulus data packet is reduced. In other words, the reference annulus boundary (1) is moved so as to agree with the position of an ECC block which is initially found when the reference annulus boundary (1) is moved in the direction in which the size of the annulus data packet is reduced, and the position at which the reference annulus boundary (1) agrees with the position of the ECC block boundary is used as an actual annulus boundary (1). When a crossing at which the horizontal line indicating the actual annulus boundary (1) crosses the accumulated amount $\Sigma_W$ is denoted by point B, the vertical distance between point B and the horizontal axis is the first actual annulus size (1) of an annulus data packet, and the horizontal distance between point B and the vertical line is an actual annulus period (1) corresponding to the first actual annulus size (1). The actual-annulus-size-data extracting unit 63 extracts, from the recording data buffer 61, main video data having the actual annulus size (1) as the first annulus data packet.

Next, when time t is $2 \times T_{REF}$, the actual-annulus-size-data extracting unit 63 extracts, from the main video data stored in the recording data buffer 61, an annulus data packet having the second actual annulus size.

When a crossing at which the vertical line obtained when time t is $2 \times T_{REF}$ crosses the accumulated amount $\Sigma_W$ is denoted by point C, a horizontal line passing on point C is the second reference annulus boundary (2) of an annulus data packet. In the example shown in FIG. 8, since the reference annulus boundary (2) agrees with an ECC block boundary, the reference annulus boundary (2) is directly used as an actual annulus boundary (2). In this case, the vertical distance between points C and B is the actual annulus size (2) of the first annulus data packet, and the horizontal line between points C and B is an actual annulus period (2) corresponding to the actual annulus size (2). The actual-annulus-size-data extracting unit 63 extracts, from the recording data buffer 61, main video data having the actual annulus size (2) as the second annulus data packet.

Next, when time t is $3 \times T_{REF}$, the actual-annulus-size-data extracting unit 63 extracts, from the main video data stored in the recording data buffer 61, an annulus data packet having the third actual annulus size.

In other words, when a crossing at which the variable length obtained when time t is $3 \times T_{REF}$ crosses the line indicating the accumulated amount $\Sigma_W$ is denoted by point D, a horizontal line passing on point D is the third reference annulus period (3) of the third annulus-data packet. In the example shown in FIG. 8, since the reference annulus boundary (3) does not agree with an ECC block boundary, alignment with the ECC block is established in a direction in which the size of the annulus data packet is reduced. In other words, the reference annulus boundary (3) is moved so as to agree with an ECC block initially found when the reference annulus boundary (3) is moved in the direction in which the size of the annulus data packet is reduced, and the position at which the reference annulus boundary (3) agrees with the position of the ECC block is used as an actual annulus boundary (3). When a crossing at which the horizontal line of the actual annulus boundary (3) crosses the line indicating the accumulated amount $\Sigma_W$ is denoted by point E, the variable length between points E and C is the actual annulus size (3) of the third annulus data packet, and the horizontal line between points E and C is an actual annulus period (2) corresponding to the actual annulus size (3).

Subsequently, annulus data packets having actual annulus sizes are sequentially formed in a similar manner.

Next, in the recording scheduler 36 in FIG. 5, the packetization units 51 to 53 respectively packetize main video data, main audio data, and low-resolution data into annulus data packets having actual annulus sizes, as described above. The multiplexing unit 91 generates multiplexed data as one data stream by multiplexing (interleaving) the annulus data packets of the main video data, the main audio data, and the low-resolution data.

Multiplexing of the annulus data packets by the multiplexing unit 91, that is, allocation of the annulus data packets in multiplexed data, includes, for example, a method in which packets are allocated in ascending order of presentation times of annulus data items in the packets.

Although the size of the annulus data packet is actually an actual annulus size, it should be ideally a reference annulus size. In other words, although a packet having a reference annulus size originally should be employed as the annulus data packet, a packet having an actual annulus size is employed since there is physical limitation in that writing of data on the optical disk 3 is performed in units of ECC blocks. Therefore, as an annulus data packet, an actually existing packet (hereinafter also referred to as an "actual annulus", if needed) having an actual annulus size, and a virtual packet (hereinafter also referred to as a "reference annulus", if needed) having a reference annulus size can be conceived.

As described above, when an actual annulus and a reference annulus can be conceived as annulus data packets, in the case of allocating packets in ascending order of their presentation times, a method in which packets are allocated in ascending order of presentation times of actual annuli, and a method in which packets are allocated in ascending order of presentation times of reference annuli may be employed.

As the presentation time of each packet, for example, the presentation time of a sample allocated at the start or end of the packet can be employed. However, for example, the presentation time of a sample allocated at the end of the packet is employed in this embodiment. Nevertheless, packets may only include not samples up to the last sample of a frame, but samples up to a sample in the middle of the frame. In this case, as the presentation time of the last sample of the packet, for example, the presentation time of the last frame in which samples up to the last sample are included in the packet is employed. In other words, when a packet is constituted by the first sample of the $N_1$-th frame to a sample in the middle of the $N_2$-th frame ($N_1 < N_2$), the presentation time of the last sample of the packet means the ($N_2-1$)-th frame including samples up to the last sample of the frame. In addition, as the presentation time of the packet, the presentation time of a GOP (Group of pictures) or the like which is allocated at the start or end of the packet may be employed.

When, in multiplexed data, packets of annulus data are allocated in ascending order of presentation times of actual annuli, since alignment with an ECC block is established, there may be a case in which consecutive packets of data in the same series are allocated.

In other words, when alignment with the ECC block is not established, that is, data is packetized such that the data is sectioned by the reference annulus size, for example, if the reference annulus periods $T_{REF}$ of main audio data and main video data are identical to each other, main audio data and main video data of a certain frame are packetized into packets in which the last sample is played back at the same time. Thus, the packets of the main audio data and the main video data have no difference in priority (order) based on presentation times.

Conversely, when alignment with an ECC block is established, that is, data is packetized such that the data is sectioned by the actual annulus size, for example, even if the reference annulus periods $T_{REF}$ of main audio data and main video data are identical to each other, there may be a case in which main audio data and main video data of a certain frame are packetized into packets in which the last sample is played back at different presentation times. As a result, in multiplexed data, consecutive packets of data in a single series, such as packets of main video data and packets of main audio data, are allocated, whereby main video data and main audio data associated therewith can be allocated at greatly remote positions.

Figure 9A:
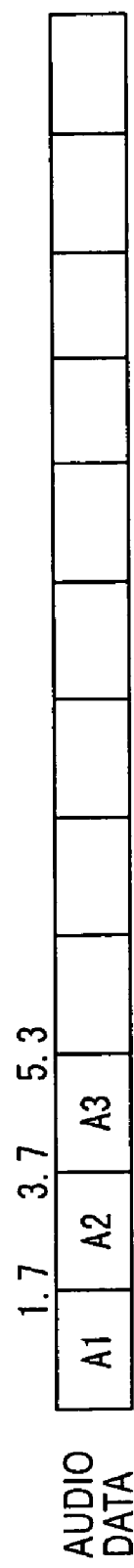
FIGS. 9A and 9B are illustrations of consecutive arrangements of video annuli and audio annuli obtained after alignment is established.
Figure 9B:
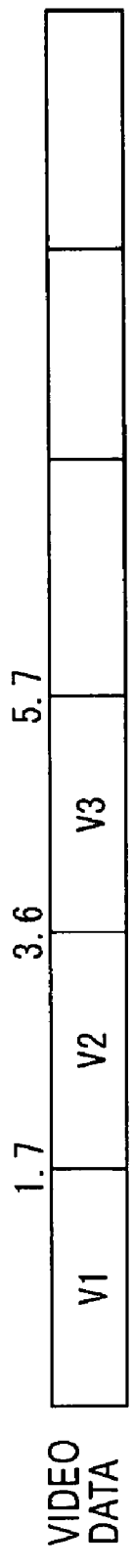

By way of example, it is assumed that, as FIGS. 9A and 9B show, main audio data is packetized into packets (audio annuli) A1, A2, A3, etc., and main video data is packetized into packets V1, V2, V3, etc., while establishing alignment with ECC blocks. In FIG. 9A, the presentation times of the last samples of audio annuli A1, A2, and A3 are 1.7-second, 3.7-second, and 5.3-second points, respectively. In FIG. 9B, the presentation times of the last samples of video annuli V1, V2, and V3 are 1.7-second, 3.6-second, and 5.3-second points, respectively.

Accordingly, by allocating the audio annuli A1, A2, and A3 (shown in FIG. 9A), and the video annuli V1, V2, and V3 (shown in FIG. 9B) in ascending order of the presentation times of the last samples of actual annuli, the annuli are allocated in the order of A1, V1, V2, A2, A3, and V3, in which the video annuli V1 and V2 are consecutively allocated and also the audio annuli A2 and A3 are consecutively allocated.

In this embodiment, when the presentation times of the last samples of the packets are identical, annuli are allocated in multiplexed data in the order of main audio data, main video data, and low-resolution data. Therefore, in FIGS. 9A and 9B, the presentation times of the last samples of audio annulus A1 and video annulus V1 are both 1.7-second points. However, audio annulus A1, which has higher priority, is initially allocated, and video annulus V1 is subsequently allocated.

In addition to 1-channel audio data, multichannel audio data may be employed as the main audio data. When multichannel audio data is employed as the main audio data, priorities in the case of identical presentation times also for the multichannel audio data must be determined.

As described above, in the case of employing the method in which packets are allocated in ascending order of presentation times of actual annuli, there may be a case in which packets of data in a single series are consecutively allocated.

Also, in the case of employing the method in which packets are allocated in ascending order of the presentation times of reference annuli, as described above, when the reference annulus periods $T_{REF}$ of main audio data and main video data are identical to each other, main audio data and main video data of a frame are packetized into packets in which last samples are played back at the same time. Accordingly, the packets of the main audio data and the main video data have no difference in priority based on presentation times. As a result, based on priority in a case in which the presentation times of the last samples of the packets are identical to each other, packets allocated in multiplexed data are determined. This case eliminates consecutive allocation (as described with reference to FIGS. 9A and 9B) of packets in a single data series, such as video annuli or audio annuli.

Accordingly, the method in which packets are allocated in ascending order of the presentation times of reference annuli is employed as allocation of packets in multiplexed data.

Compared with the case of employing the method in which packets are allocated in ascending order of the presentation times of actual annuli, in the case of employing the method in which packets are allocated in ascending order of the presentation times of reference annuli, the capacity required for the recording data buffer 61 may be inferior. However, a movement of the reference annulus boundary by alignment with ECC blocks requires at most one ECC block size. Thus, the capacity required for the recording data buffer 61 is not a so big problem.

Figure 10:
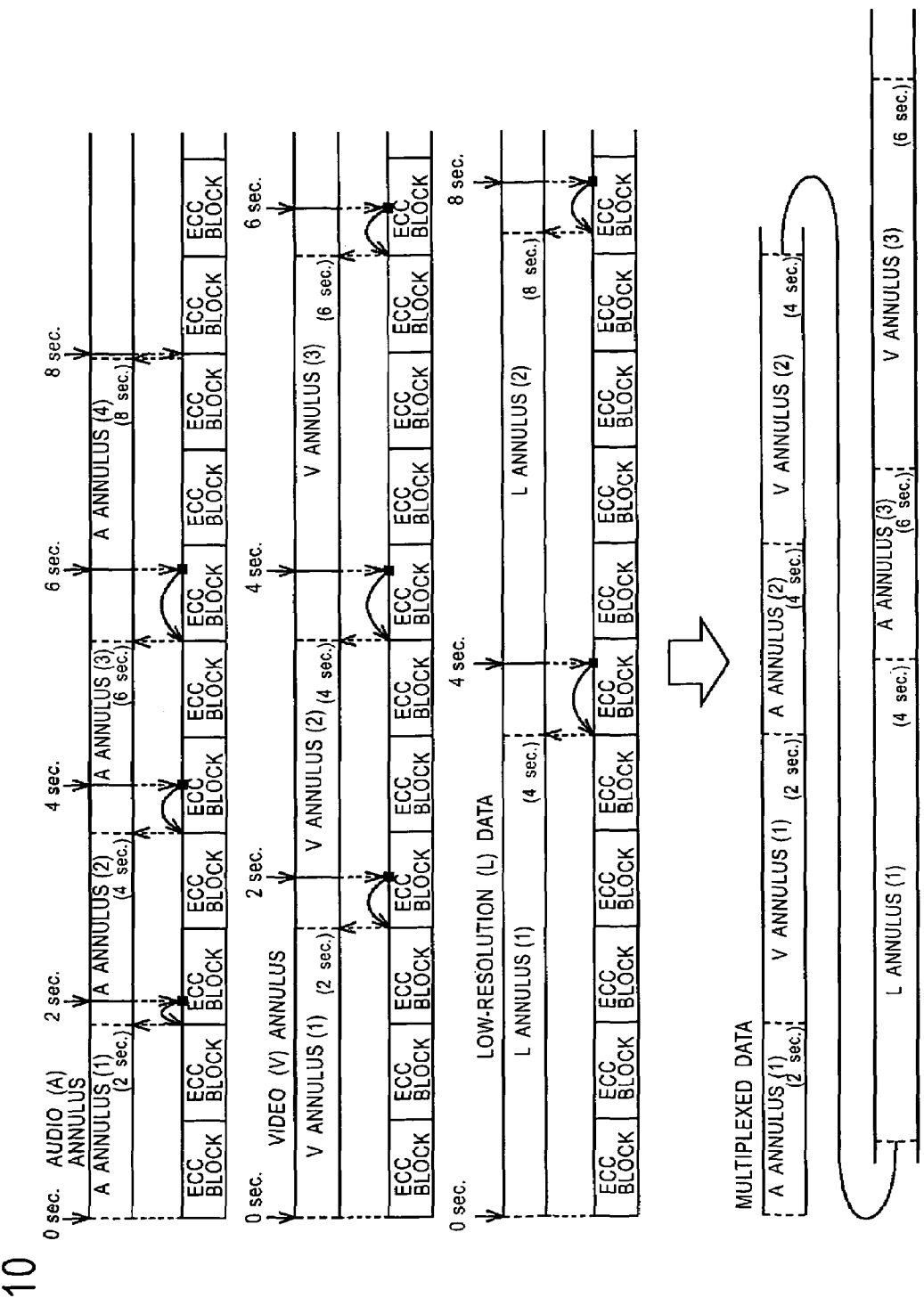
FIG. 10 is an illustration of multiplexed data.

FIG. 10 shows multiplexed data obtained such that the multiplexing unit 91 allocates actual-annulus-sized packets of the main video data, the main audio data, and low-resolution data from the packetization units 51 to 53 in ascending order of the presentation times of reference annuli.

In the example shown in FIG. 10, the reference annulus periods of the main video data and the main audio data are each set to 2 seconds, and the reference annulus period of the low-resolution data is set to 4 seconds. Also, in FIG. 10, the quadrangles marked "A ANNULUS", "V ANNULUS", and "L ANNULUS" indicate actual-annulus-sized annulus-data packets of main video data, main audio data, and low-resolution data, respectively. In addition, the parenthesized numerals in the lower right of each quadrangle indicating a packet represents, in units of seconds, a presentation time at which, when the packet is used as a reference annulus, the last sample of the reference annulus is played back.

When the packets are allocated in ascending order of the presentation times of reference annuli, and if the presentation times of reference annuli are identical, by allocating the packets in the order of main audio data, main video data, and low-resolution data, packets in a single data series are prevented from being consecutively allocated, as shown in FIG. 10, and packets of each of main audio data, main video data, and low-resolution data are cyclically allocated in the same order. In other words, in the example in FIG. 10, the reference annulus periods of main video data and main audio data are identically 2 seconds, and the reference annulus period of low-resolution data is 4 seconds, which is twice the reference annulus period of each of the main video data and the main audio data. Thus, Although the cycles of allocating the main video data and the main audio data are identical, the cycle of allocating the low-resolution data is twice the cycle of allocating packets of the main video data and the main audio data. In other words, in the example in FIG. 10, after a packet of main audio data and a packet of main video data are alternately allocated twice, a packet of low-resolution data is allocated once, whereby multiplexed data is formed.

Figure 11:
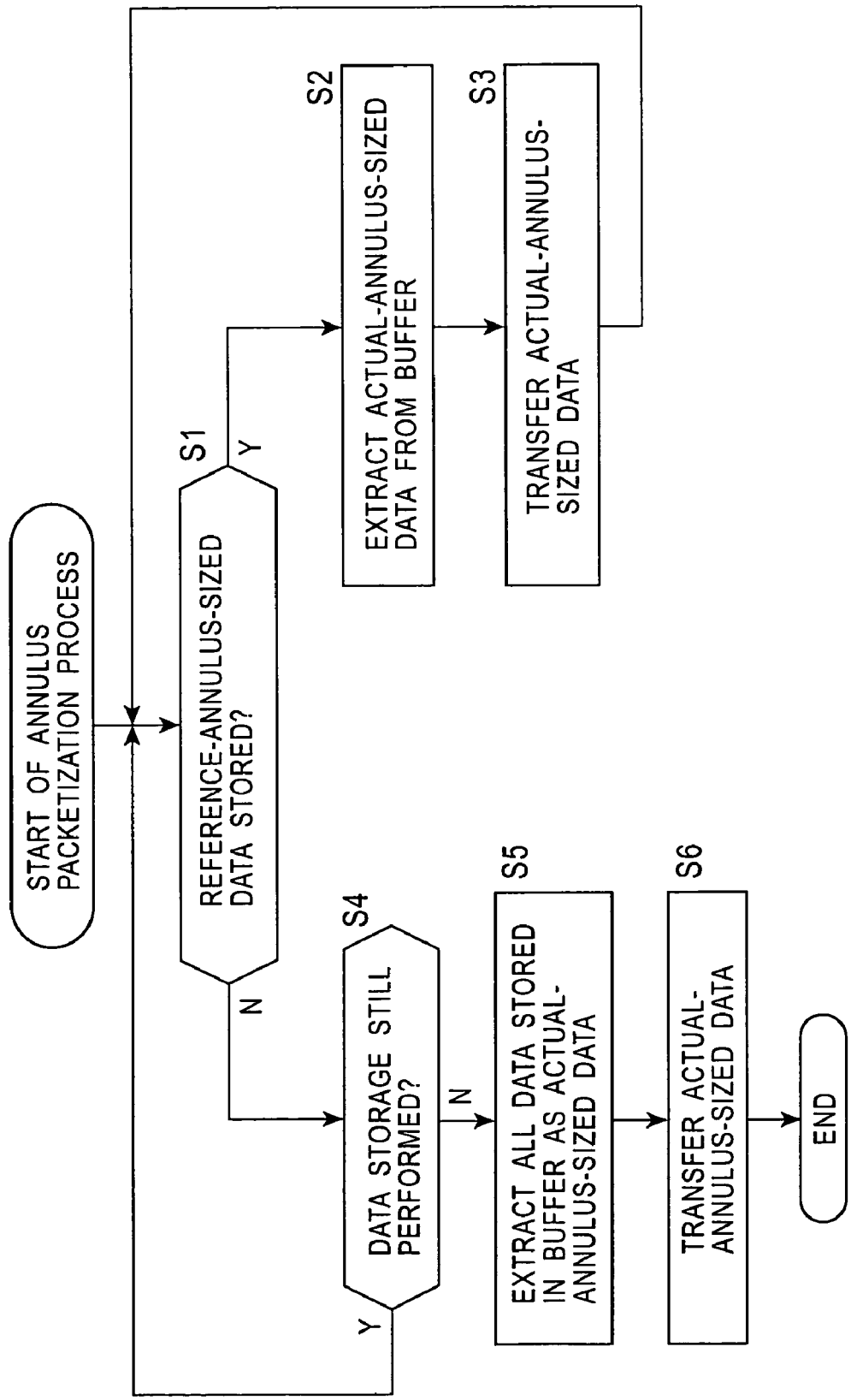
FIG. 11 is a flowchart illustrating an annulus packetizing process.

Next, the annulus packetization process of the packetization unit 51 in FIG. 5 is further described with reference to the flowchart shown in FIG. 11. Since a process (annulus packetization process) similar to that of the packetization unit 51 is performed by the packetization units 52 and 53, its description is omitted.

The annulus packetization process is started, for example, such that supply of main video data to the packetization unit 51 is started, and the recording data buffer 61 starts to store the main video data.

Specifically, in the annulus packetization process, in step S1, the reference-annulus-size determining unit 62 determines whether main video data having a reference annulus size is stored in the recording data buffer 61. Determination of whether the main video data having the reference annulus size is stored in the recording data buffer 61 is performed depending on whether, after the recording data buffer 61 starts to store main video data, or the last reference annulus period elapses, the present reference annulus period has elapsed.

In step S1, when it is determined that the main video data having the reference annulus period is stored in the recording data buffer 61, the process proceeds to step S2. In step S2, the actual-annulus-size-data extracting unit 63 reads and extracts main video data (actual-annulus-size data) having an actual annulus size, and the process proceeds to step S3. In step S3, the main video data (having the actual annulus size) extracted from the recording data buffer 61 is transferred by the actual-annulus-size-data extracting unit 63 and is stored as an annulus data packet in the actual-annulus-size-data storage unit 64. The process returns to step S1, and similar processing is subsequently repeated.

In step S1, conversely, when it is determined that the main video data having the reference annulus size has not been stored in the recording data buffer 61 yet, the process proceeds to step S4. The reference-annulus-size determining unit 62 determines whether the supply of main video data to the recording data buffer 61 is still performed, which allows the recording data buffer 61 to still continue to store the main video data. In step S4, when it is determined that the supply of the main video data to the recording data buffer 61 is still performed, the process returns to step S1, and similar processing is subsequently repeated.

In step S4, conversely, when it is determined that the recording data buffer 61 does not store the main video data, that is, the supply of the main video data to the packetization unit 51 ends, the process proceeds to step S5. The actual-annulus-size-data extracting unit 63 reads all the main video data stored in the recording data buffer 61, and adds, to the required minimum stuffing bits, the read main video data for establishing alignment with ECC blocks. The process proceeds to step S6. In step S6, the main video data to which the stuffing bits are added in step S5 is transferred by the actual-annulus-size-data extracting unit 63 and is stored as an annulus data packet in the actual-annulus-size-data storage unit 64. The annulus packetization process ends.

In the annulus packetization process, main video data, main audio data, and low-resolution data are recorded on the optical disk 3. However, for example, main video data and main audio data may be recorded, and in addition to main video data, main audio data, and low-resolution data, time codes added to frames of the main video data, etc., may be recorded. In the case of recording main video data and main audio data on the optical disk 3, that is, when low-resolution data is not recorded, the recording scheduler 36 can be formed without including the packetization unit 53 for performing the annulus packetization process on the low-resolution data. Also, in the case of recording time codes, etc., in addition to main video data, main audio data, and low-resolution data, the recording scheduler 36 must include a new packetization unit for performing an annulus packetization process on a data series such as the time codes. As described above, multichannel audio data can be employed as the main audio data. In this case, the recording scheduler 36 must include packetization units corresponding to the channels of the audio data in order to perform the annulus packetization process on the audio data on each channel.

Figure 12:
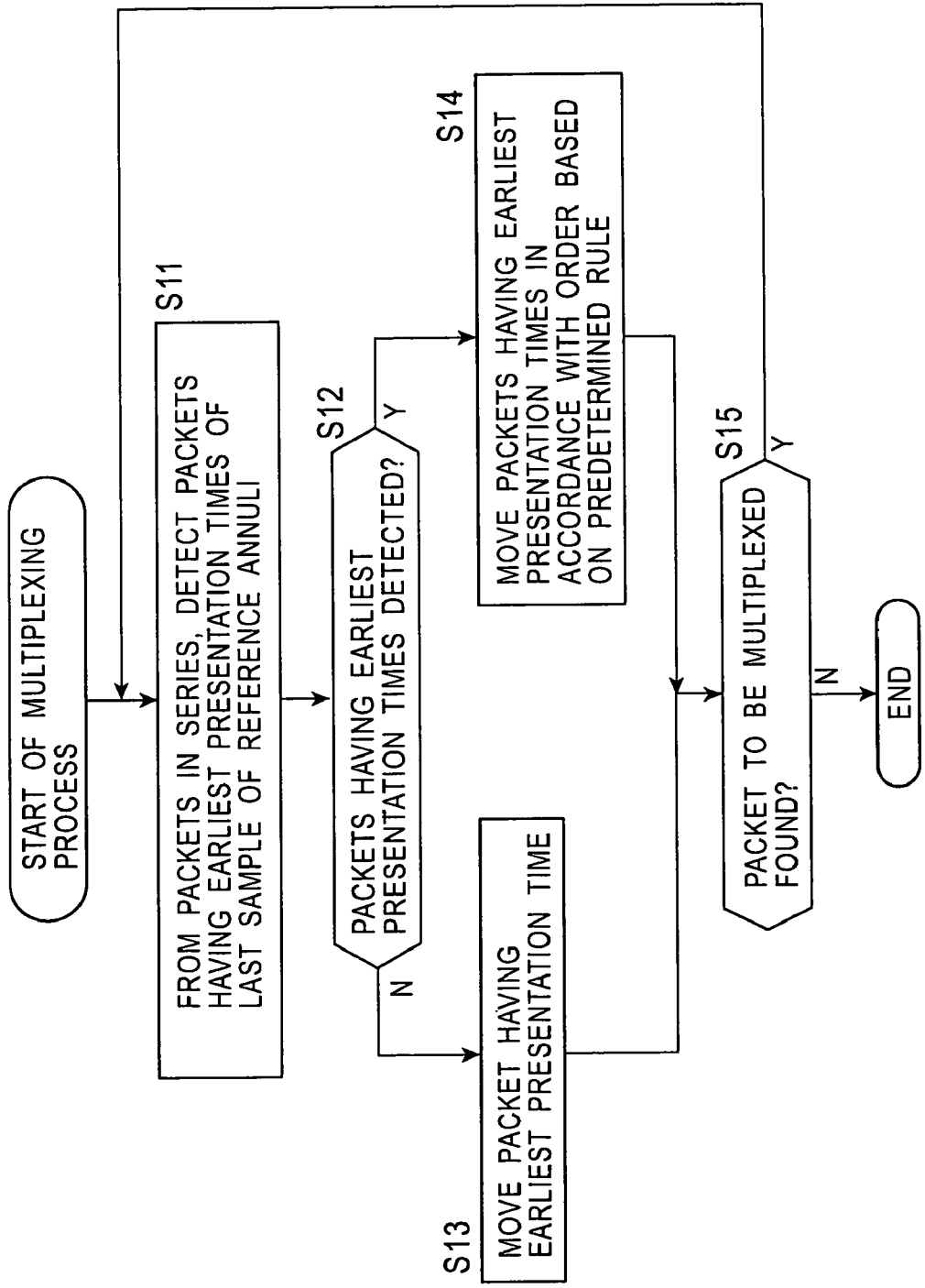
FIG. 12 is a flowchart illustrating a multiplexing process.

Next, a multiplexing process in which the multiplexing unit 91 in FIG. 5 generates multiplexed data as a data stream by multiplexing packets of main video data, main audio data, and low-resolution data is described below with reference to the flowchart shown in FIG. 12.

The multiplexing process is started such that the actual-annulus-size-data storage units 64, 74, and 84 in the packetization units 51 to 53 start to store packets of main video data, main audio data, and low-resolution data.

In the multiplexing process, in step S11, the multiplexing unit 91 detects, from the packets stored in the actual-annulus-size-data storage unit 64, 74, and 84, packets (hereinafter also referred to as "earliest-presentation-time packets") having the earliest presentation times of the last samples of reference annuli. The process proceeds to step S12. In step S12, the multiplexing unit 91 determines whether a plurality of earliest-presentation-time packets have been detected in step S1, that is, whether earliest-presentation-time packets have been detected from at least two of the actual-annulus-size-data storage units 64, 74, and 84.

In step S12, when it is determined that the earliest-presentation-time packets have not been detected, that is, when one earliest-presentation-time packet has been detected in step S11, the process proceeds to step S13. The multiplexing unit 91 moves the earliest-presentation-time packet detected in step S11 from the actual-annulus-size-data storage unit 64, 74, or 84 to the multiplexed data buffer 92, and stores the moved packet at the end in the multiplexed data buffer 92. The process proceeds to step S15.

In step S12, conversely, when it is determined that the earliest-presentation-time packets have been detected, the process proceeds to step S14. In step S14, the multiplexing unit 91 moves the earliest-presentation-time packets detected in step S11 from the actual-annulus-size-data storage unit 64, 74, or 84 to the multiplexed data buffer 92, and stores the moved packets at the end in the multiplexed data buffer 92. The process proceeds to step S15.

In step S14, the multiplexing unit 91 moves the earliest-presentation-time packets in order based on a predetermined rule from the actual-annulus-size-data storage unit 64, 74, or 84 to the end of the multiplexed data buffer 92.

In other words, in step S14, as described above, the moving sequence of the earliest-presentation-time packets is determined in the order of main audio data, main video data, and low-resolution data. In accordance with the moving sequence, the earliest-presentation-time packets are moved to the end of the multiplexed data buffer 92.

In step S15, the multiplexing unit 91 determines whether an earliest-presentation-time packet to be multiplexed is still stored in any of the actual-annulus-size-data storage units 64, 74, and 84. When it is determined that the earliest-presentation-time packet to be multiplexed is still stored, the process returns to step S11, and subsequently repeats similar processing.

The multiplexed data buffer 92 uses the above multiplexing process to generate multiplexed data (as shown in FIG. 10) as one data stream which is obtained by multiplexing the packets of main video data, main audio data, and low-resolution data.

As described above, a start of storage of multiplexed data by the multiplexed data buffer 92 allows the writing controller 38 to start a writing control process for writing the multiplexed data on the optical disk 3.

Accordingly, the writing control process of the writing controller 38 is described below with reference to the flowchart shown in FIG. 13.

In the writing control process, in step S21, the writing controller 38 reserves consecutive empty areas on the optical disk 3 for an ALLOCATION_UNIT representing the number of preset logical blocks. Specifically, the writing controller 38 requests the file system driver 33 to reserve the consecutive empty areas for the ALLOCATION_UNIT. In response to this request, the file system driver 33 reserves the consecutive empty areas for the ALLOCATION_UNIT from the recording areas of the optical disk 3.

The empty areas on the optical disk 3, reserved by the writing controller 38, are hereinafter also referred to as the "reserved areas".

After that, proceeding to step S22, the writing controller 38 reads, from the multiplexed data buffer 92, the maximum amount of multiplexed data in units of packets which can be recorded in the reserved areas. Specifically, the writing controller 38 reads the maximum amount of multiplexed data in units of packets which can be recorded in the reserved areas in the order in which the packets are stored in the multiplexed data buffer 92, and supplies the read multiplexed data to the file system driver 33 with a writing command to request writing to the reserved areas on the optical disk 3. Accordingly, in accordance with the writing command supplied from the writing controller 38, the file system driver 33 uses the device driver 32 and the drive 2 to write the multiplexed data in units of packets supplied from the writing controller 38 into the reserved areas on the optical disk 3.

In the drive 2, writing of the multiplexed data in units of packets into the reserved areas is sequentially performed, for example, from the beginning (the earliest position in the order in the drive 2 of reading/writing to the optical disk 3) of the reserved areas.

The recording scheduler 36 generates packets of annulus data having an actual annulus size close to the reference annulus size by performing the annulus packetization process on data series of main video data, main audio data, and low-resolution data, as described above. Accordingly, if the packets of annulus data are recoded in divided form, it does not make much sense to use the annulus packetization process to packetize data series to packets of annulus data, which is a set of data units. Also, when packets of annulus data are recorded on the optical disk 3 in divided form, there may be a case in which, when the divided portions are read, seeking occurs to hinder real-time playback.

Therefore, the writing controller 38 writes the multiplexed data on the optical disk 3 so that division of packets of annulus data, and real-time playback can be prevented as much as possible.

At first, in order to prevent a packet of annulus data from being divided, after reserving, on the optical disk 3, consecutive empty areas whose size is equal to or greater than the actual annulus size, which is the size of the packet, the packet may be written in the empty areas.

Also, in order to prevent hindrance of real-time playback caused by seeking, in duration in which the seeking is performed, by using data already read from the optical disk 3, playback may be continued. Accordingly, it is preferable to read a certain amount of data from the optical disk 3 without performing seeking. Thus, it is preferable that data items be consecutively written in a certain number of consecutive recording areas. Whether to prevent hindrance of real-time playback by reading what amount of data without performing seeking depends on the performance of a recording/playback system that plays back the optical disk 3.

Therefore, in order to prevent division of packets of annulus data, and hindrance of real-time playback as much as possible, it is ideally preferable to consecutively record all the multiplexed data in the consecutive recording areas on the optical disk 3.

However, aside from a case in which the optical disk 3 is not in use and has large consecutive empty areas, in a case in which, on the optical disk 3, data is recorded and deleted a number of times, empty areas are divided. In this case, it is impossible to consecutively record all the multiplexed data in consecutive recording areas on the optical disk 3.

Accordingly, in step S21, the writing controller 38 reserves the consecutive empty areas for the ALLOCATION_UNIT as reserved areas, and writes the multiplexed data in units of packets in the reserved areas.

As described above, the reserved areas are constituted by consecutive logical blocks for the ALLOCATION_UNIT, and the multiplexed data is written in units of packets in the reserved areas. In other words, in the reserved areas, the multiplexed data is written in units of packets from the beginning of the areas, and at the time the packets cannot be written, that is, at the time the size of a remaining part the reserved areas is less than the size of a packet to be written in the recording areas, writing of the multiplexed data into the reserved areas is terminated.

In this case, it is guaranteed that items of the multiplexed data are consecutively written as many as the number of logical blocks which is a value obtained by subtracting the number of logical blocks (corresponding to the maximum value of the actual annulus size) from the ALLOCATION_UNIT. Thus, the ALLOCATION_UNIT is an important parameter for guaranteeing real-time playback, and is preferably set to an optimal value in accordance with the performance of the recording/playback system for playing back the optical disk 3.

When the number of logical blocks which corresponds to the maximum value of the actual annulus size is represented by $N_{max}$, in the case of reserving the consecutive empty areas for the ALLOCATION_UNIT as reserved areas and writing the multiplexed data in units of packets in the reserved areas, in normal playback (playback which is not special playback), seeking can occur a maximum of once to consecutive recording areas formed by the number of logical blocks which is represented by the ALLOCATION_UNIT$-N_{max}$. Accordingly, even if seeking occurs at such a frequency, it is preferable to set the ALLOCATION_UNIT so that playback by the recording/playback system for playing back the optical disk 3 is not interrupted.

When the maximum value of the actual annulus size is represented by $B_{max}$ [bytes], if the size of logical blocks is, for example, 64 [KB], the number $N_{max}$ of logical blocks which corresponds to the maximum value of the actual annulus size can be represented by the expression $N_{max}=B_{max}$ [bytes]/64000 [B].

After, in step S22, the maximum amount of multiplexed data in units of packets which can be recorded in the reserved areas is recorded in the reserved areas, the process proceeds to step S23. In step S23, the writing controller 38 determines whether the recording areas used as the reserved areas include a remaining part (empty areas) in which the multiplexed data is not recorded. When it is determined that no part is included, that is, when the multiplexed data can be properly recorded in units of packets in the reserved areas, the process skips over step S24 and proceeds to step S25.

In step S23, when it is determined that the reserved areas include the remaining part in which the multiplexed data is not recorded, the process proceeds to step S24, and the writing controller 38 frees the remaining part of the reserved areas. In other words, the writing controller 38 requests the file system driver 33 to free the remaining part of the reserved areas. In response to this request, the file system driver 33 frees the remaining part of the reserved areas, which is included in the recording areas of the optical disk 3 and which has no recorded multiplexed data.

Proceeding to step S25, the writing controller 38 determines whether multiplexed data to be recorded on the optical disk 3 is still stored in the multiplexed data buffer 92. In step S25, when it is determined that the multiplexed data to be recorded on the optical disk 3 is still stored in the multiplexed data buffer 92, the process returns to step S21 and similar processing is subsequently repeated. This records, on the optical disk 3, the multiplexed data still stored in the multiplexed data buffer 92.

In step S25, conversely, when it is determined that the multiplexed data to be recorded on the optical disk 3 is not stored in the multiplexed data buffer 92, the writing control process is terminated.

Reservation (in step S21) of the consecutive empty areas for the ALLOCATION_UNIT includes, for example, a first reservation method in which, in empty areas formed by the number of consecutive logical blocks which is equal to or greater than the ALLOCATION_UNIT on the optical disk 3, from the maximum number of consecutive empty areas, consecutive empty areas for the ALLOCATION_UNIT are reserved, a second reservation method in which, from consecutive empty areas having the earliest position in the order of writing/reading data on the optical disk 3, consecutive empty areas for the ALLOCATION_UNIT are reserved, and a third reservation method in which, from empty areas closest to a recording area in which data is last recorded, consecutive empty areas for the ALLOCATION_UNIT are reserved. In this embodiment, for example, the second reservation method is employed.

Here, in a case in which the optical disk 3 has no defect, when there are consecutive logical blocks, there are also consecutive physical blocks. The physical blocks are respectively assigned to the consecutive logical blocks, and form physically consecutive empty areas. Accordingly, by reserving consecutive logical blocks for the ALLOCATION_UNIT as reserved areas, and consecutively writing data in the reserved areas, the data is recorded in the physically consecutive recording areas. In the case of reading the data consecutively recorded in the physically consecutive recording positions, no seeking occurs.

Nevertheless, actually, a defect is developed in the optical disk 3. For the defect, slip processing in which assignment of a logical block to a physical block having the defect slips to a physical block just after the physical block having the defect, and reassigning processing in which a logical block is reassigned to another normal physical block are performed. When the slip processing or the reassigning processing is performed, consecutiveness of physical blocks corresponding to logical blocks having consecutive logical block numbers is not guaranteed. Accordingly, even when empty areas formed by logical blocks having consecutive logical block numbers are reserved, physical blocks corresponding to the logical blocks having the consecutive logical block numbers are not always consecutive. When the physical blocks are inconsecutive, seeking occurs at the inconsecutive portions.

To prevent the above problem, for example, the writing controller 38 acquires defect information concerning a physical block having a defect, and must control writing so that data is not recorded in the physical block having the defect and physical blocks adjacent thereto.

Figure 13:
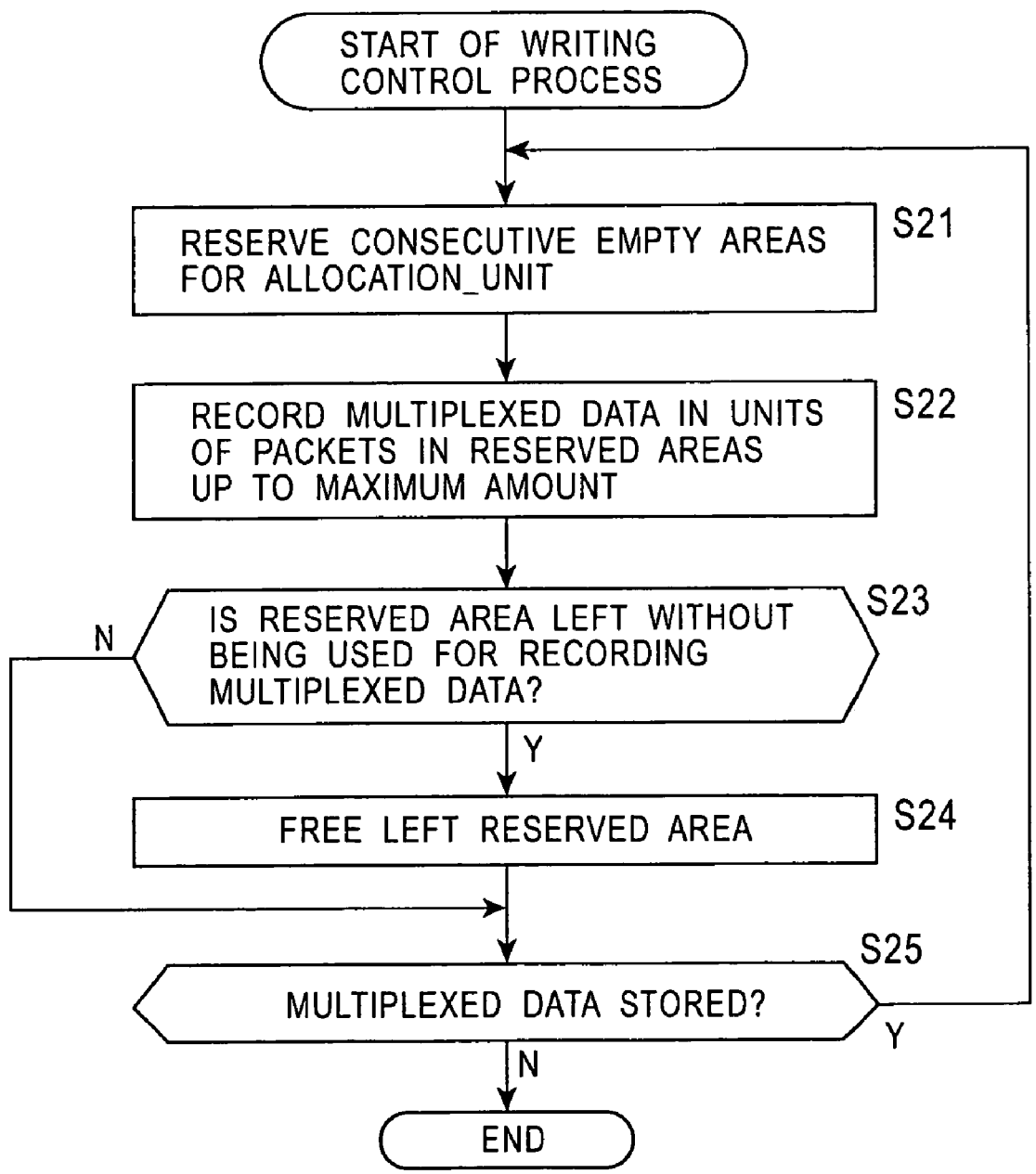
FIG. 13 is a flowchart illustrating a writing control process.

Next, the writing control process in FIG. 13 is further described below with reference to FIGS. 14A and 14b to FIG. 17.

In FIGS. 14A to FIG. 17F (similarly in FIGS. 19A to 19E described later), for brevity of description, it is assumed that multiplexed data consists of packets of two data series, main video data and main audio data.

Also, in FIGS. 14A to FIG. 17F (similarly in FIGS. 19A to 19E described later), logical sectors assigned to physical sectors on the optical disk 3 have 2048 [bytes], an ECC block (physical block) has 64 [KB], and an ALLOCATION_UNIT is constituted by 18 logical blocks (ECC blocks).

In this case, one ECC block is constituted by 2 logical sectors (physical sectors), and the ALLOCATION_UNIT is constituted by 576 logical sectors (physical sectors) in terms of logical sectors (physical sectors).

Figure 14A:
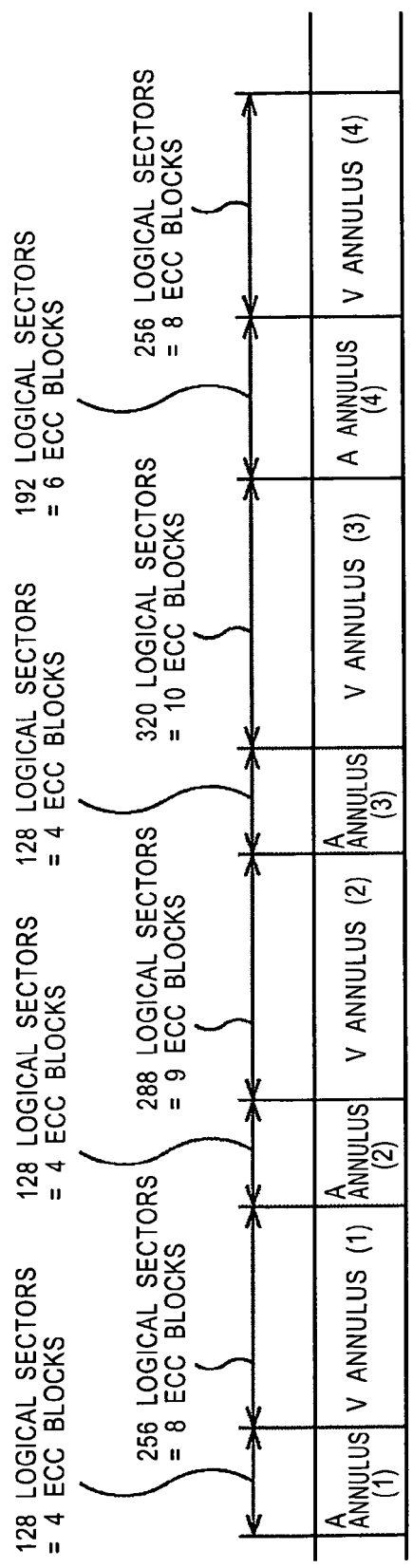
FIGS. 14A and 14B are illustrations of multiplexed data and an empty area of the optical disk 3 in FIG. 1, respectively.

At first, a case in which the multiplexed data shown in FIG. 14A is recorded in the empty areas shown in FIG. 14B on the optical disk 3 is described below.

The multiplexed data in FIG. 14A is formed by sequentially allocating, from its beginning, an audio annulus (A ANNULUS) (1) for 4 ECC blocks, a video annulus (V ANNULUS) (1) for 8 ECC blocks, an audio annulus (2) for 4 ECC blocks, a video annulus (2) for 9 ECC blocks, an audio annulus (3) for 4 ECC blocks, a video annulus (3) for 10 ECC blocks, an audio annulus (4) for 6 ECC blocks, and a video annulus (4) for 8 ECC blocks.

Figure 14B:
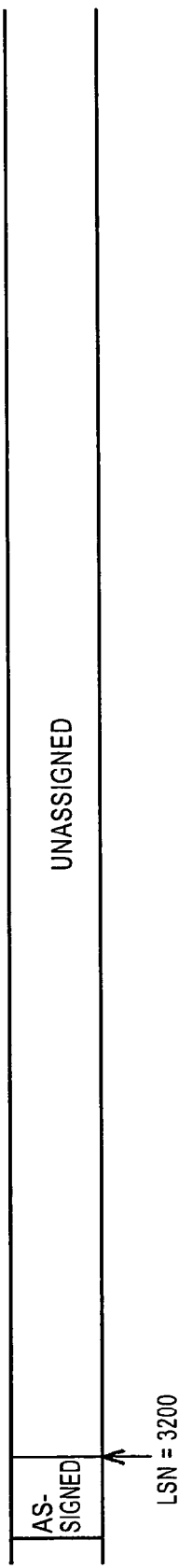

FIG. 14B shows that, on the optical disk 3, from the logical sector whose logical sector number (LSN) is 3200, there are consecutive empty areas (unassigned area) whose size is equal to or greater than the size of the entire multiplexed data in FIG. 14A. The logical sector number is a number which is given to a logical sector assigned to a physical sector and which specifies the logical sector.

Figure 15A:
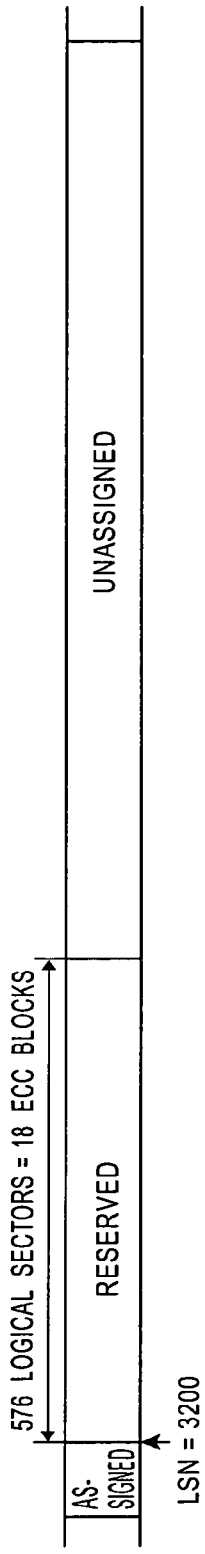
Figure 15B:
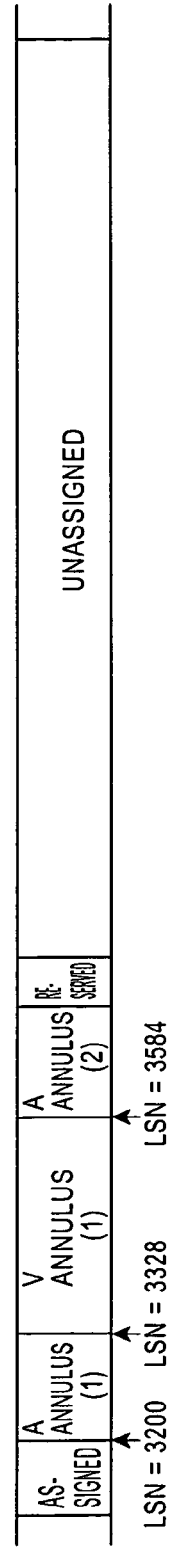
Figure 15C:
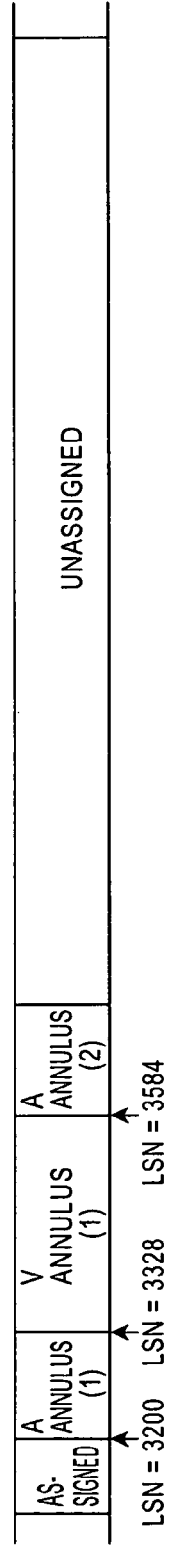

In this case, the multiplexed data in FIG. 14A is recorded in the empty areas in FIG. 14B, as shown in FIG. 15.

At first, empty areas which begin at logical sector #3200 (the logical sector whose logical sector number is 3200) and which is constituted by 18 consecutive ECC blocks represented by the ALLOCATION_UNIT are reserved as reserved areas (step S21). Multiplexed data in units of packets which can be recorded in the reserved areas is recorded (step S22). In this case, regarding the multiplexed data in FIG. 14A, the audio annulus (1) at the beginning, the video annulus (1), and the audio annulus (2) can be recorded in the reserved areas, but the beginning to the video annulus (2) cannot be recorded in the reserved areas. Accordingly, the audio annulus (1), the video annulus (1), and the audio annulus (2) are recorded in the reserved areas. A remaining part of the reserved areas left after recording the audio annulus (1), the video annulus (1), and the audio annulus (2) is freed (step S24).

After that, empty areas which begin at logical sector #3712 next to the logical sector in which the audio annulus (2) is recorded and which is constituted by 18 consecutive ECC blocks are reserved as reserved areas (step S21). Multiplexed data in units of packets which can be recorded in the reserved areas is recorded (step S22). In this case, regarding the multiplexed data in FIG. 14A, the video annulus (2) next to the audio annulus (2) finally recorded in the previous recording, and the audio annulus (3) can be recorded in the reserved areas, but both annuli and the audio annulus (3) cannot be recorded in the reserved areas. Accordingly, the video annulus (2) and the audio annulus (3) are recorded in the reserved areas. Part of the reserved areas left after recording the audio annulus (3) is freed (step S24).

Subsequently, the multiplexed data in FIG. 14A is recorded on the optical disk 3 in a similar manner.

In the examples shown in FIGS. 14A to 15, as described with reference to FIG. 14B, since the optical disk 3 has consecutive empty areas whose size is equal to or greater than the size of the entire multiplexed data in FIG. 14A, the entire multiplexed data in FIG. 14A is consecutively recorded in consecutive recording areas on the optical disk 3.

Figure 16A:
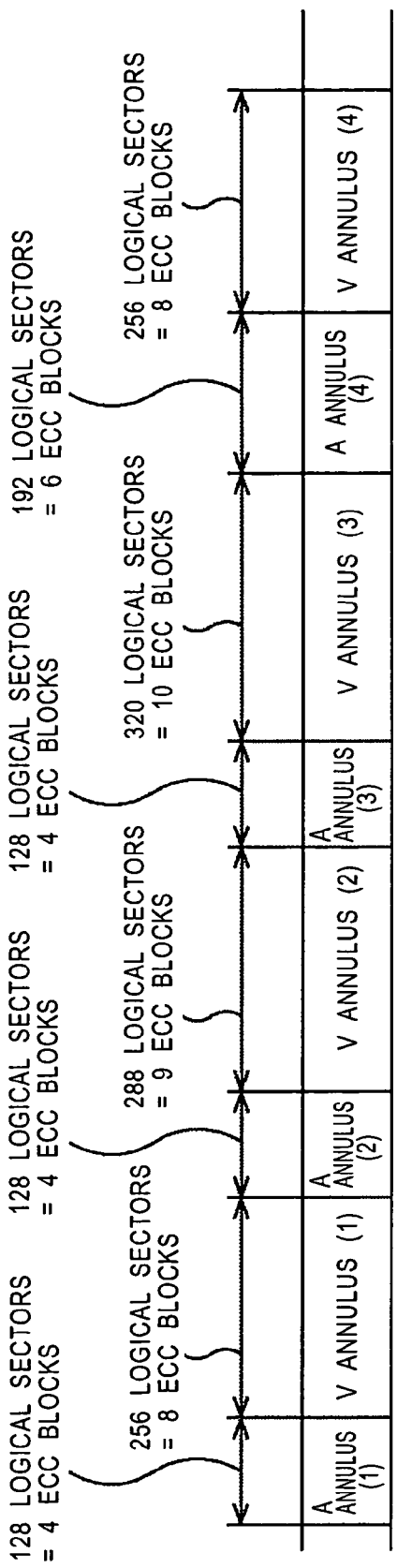
FIGS. 16A and 16B are illustrations of multiplexed data and an empty area on the optical disk 3 in FIG. 1, respectively.

Next, a case in which the multiplexed data shown in FIG. 16A is recorded in the empty areas shown in FIG. 16B on the optical disk 3 is described below.

Similarly to the multiplexed data in FIG. 14A, the multiplexed data in FIG. 16A is formed by sequentially allocating, from its beginning, an audio annulus (A ANNULUS) (1) for 4 ECC blocks, a video annulus (V ANNULUS) (1) for 8 ECC blocks, an audio annulus (2) for 4 ECC blocks, a video annulus (2) for 9 ECC blocks, an audio annulus (3) for 4 ECC blocks, a video annulus (3) for 10 ECC blocks, an audio annulus (4) for 6 ECC blocks, and a video annulus (4) for 8 ECC blocks.

Figure 16B:
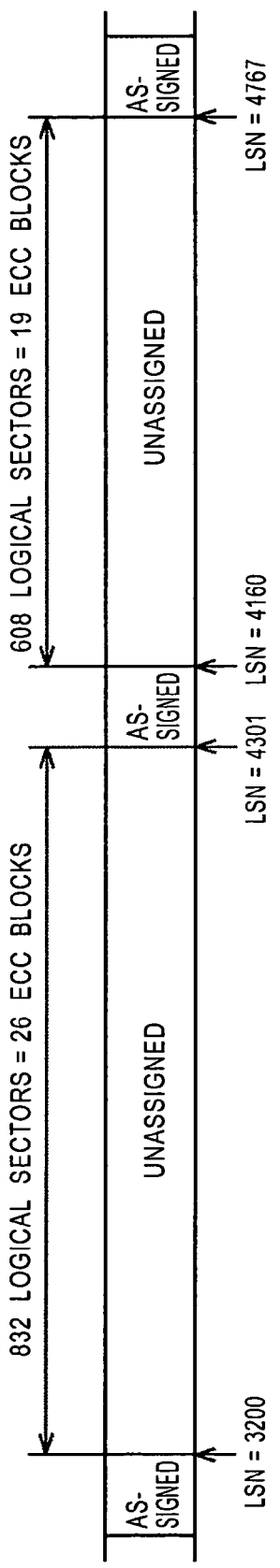

In FIG. 16B, the optical disk 3 has two sets of consecutive empty areas, one constituted by logical sectors #3200 to #4031 and the other constituted by logical sectors #4160 to #4767. Either set of the empty areas constituted by logical sectors #3200 to #4031 and the empty areas constituted by logical sectors #4160 to #4767 has a size less than that of the entire multiplexed data in FIG. 16A.

In this case, as FIGS. 17A to 17F shows, the multiplexed data in FIG. 16A is recorded in the empty areas in FIG. 16B.

Also, in this case, at first, empty areas which begin at logical sector #3200 and which are constituted by 18 consecutive ECC blocks are reserved as reserved areas (step S21). Multiplexed data in units of packets which can be recoded in the reserved areas is recorded (step S22). In this case, regarding the multiplexed data in FIG. 16A, the audio annulus (1) at the beginning, the video annulus (1), and the audio annulus (2) can be recorded in the reserved areas, but the beginning to the video annulus (2) cannot be recorded in the reserved areas. Accordingly, the audio annulus (1), the video annulus (1), and the audio annulus (2) are recorded in the reserved areas. Part of the reserved areas left after recording the audio annulus (1), the video annulus (1), and the audio annulus (2) is freed (step S24).

After that, empty areas constituted by 18 consecutive ECC blocks are reserved as reserved areas again (step S21). In the examples shown in FIGS. 16A to 17F, from logical sector #3712 next to the logical sector in which the audio annulus (2) is recorded, consecutive empty areas up to logical sector #4031 can only be reserved, and the size of these empty areas are less than the size of 18 consecutive ECC blocks. Therefore, when sector #3712 next to the logical sector in which the audio annulus (2) is recorded is used as the beginning, the empty areas constituted by 18 consecutive ECC blocks cannot be reserved.

Accordingly, in order to reserve empty areas constituted by 18 consecutive ECC blocks, empty areas which begin at logical sector #4160 and which are constituted by 18 consecutive ECC blocks are reserved as reserved areas (step S21). Multiplexed data in units of packets which can be recorded in the recorded is recorded (step S22). In this case, regarding the multiplexed data in FIG. 16A, the video annulus (2) next the audio annulus finally recorded in the previous recording, and the audio annulus (3) can be recorded in the reserved areas, but the video annulus (2) to the video annulus (3) cannot be recorded in the reserved areas. Accordingly, the video annulus (2) and the audio annulus (3) are recorded in the reserved areas. Part of the reserved areas left after recording the video annulus (2) and the audio annulus (3) is freed (step S24).

Subsequently, the multiplexed data in FIG. 16A is recorded on the optical disk 3 in a similar manner.

As described above, when the optical disk 3 does not have any consecutive empty areas whose size is equal to or greater than that of the entire multiplexed data, it is, at least, guaranteed that, regarding multiplexed data writing, items of the multiplexed data are consecutively written as many as the number of logical blocks which is a value obtained by subtracting the number of logical blocks (corresponding to the maximum value of the actual annulus size) from the ALLOCATION_UNIT, as described above.

Figure 17D:
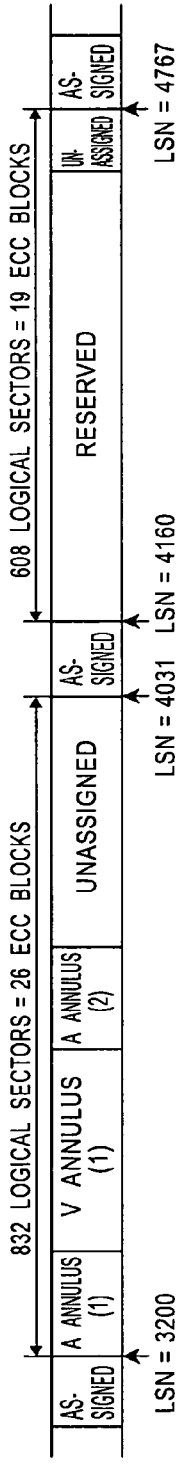
Figure 17E:
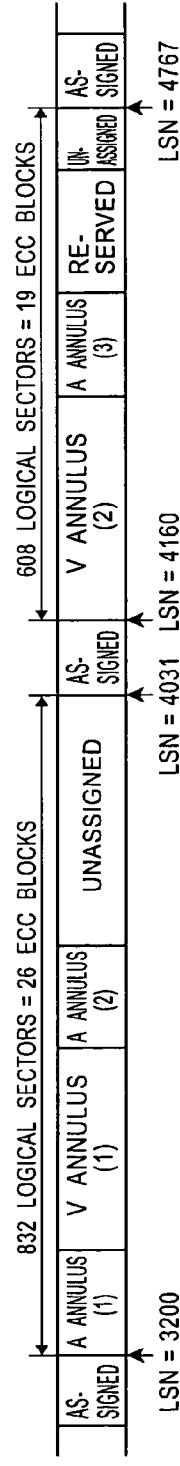
Figure 17F:
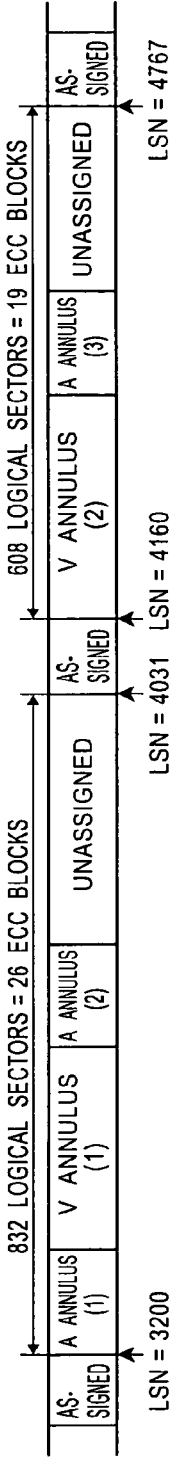

In the examples shown in FIGS. 16A and 17F, as described above, from logical sector #3712 next to the logical sector in which the audio annulus (2) is recorded, consecutive empty areas up to logical sector #4031 can only be reserved, and the empty areas constituted by logical sectors #3712 to #4031 are less in size than the ECC blocks represented by the ALLOCATION_UNIT. Thus, among consecutive empty areas constituted by the subsequent logical sectors #4160 to #4767, empty areas which begin at logical sector #4160 which are constituted by 18 consecutive ECC blocks are reserved as reserved areas.

Therefore, in the writing control process shown in FIG. 13, when consecutive empty areas which can be reserved from a logical sector next to the last logical sector in which the previous data is written is less in size than the number of ECC blocks represented by the ALLOCATION_UNIT, no data is written in the empty areas. As a result, according to the writing control process in FIG. 13, the consecutive empty areas which are less in size than the number of ECC blocks represented by the ALLOCATION_UNIT is unused to remain. This causes a possibility that the recording area of the optical disk 3 cannot be efficiently used.

Accordingly, the writing controller 38 may perform a writing control process in accordance with the flowchart shown in FIG. 18 instead of the writing control process described with reference to FIG. 13.

Figure 18:
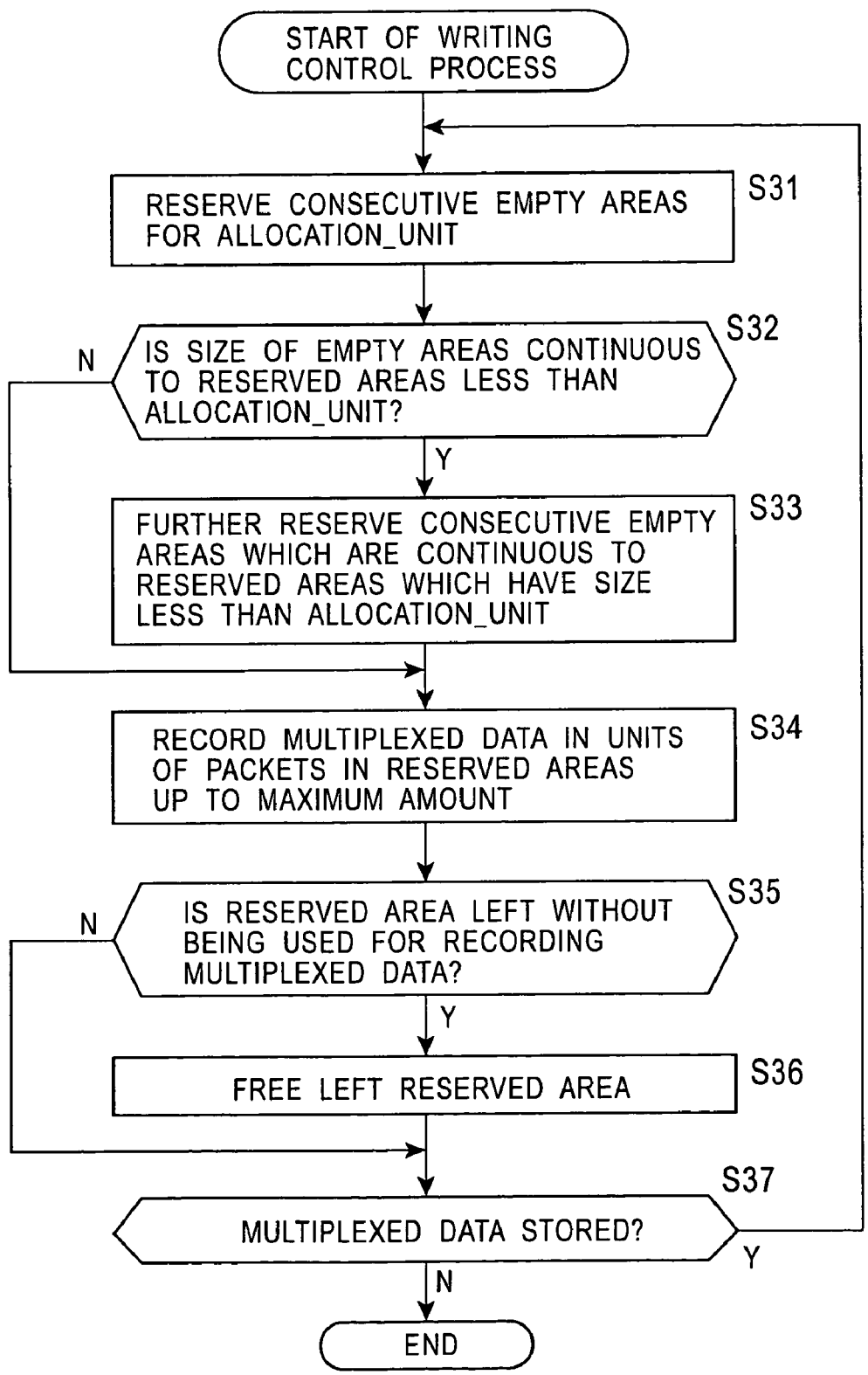
FIG. 18 is a flowchart illustrating a writing control process.
Figure 19A:
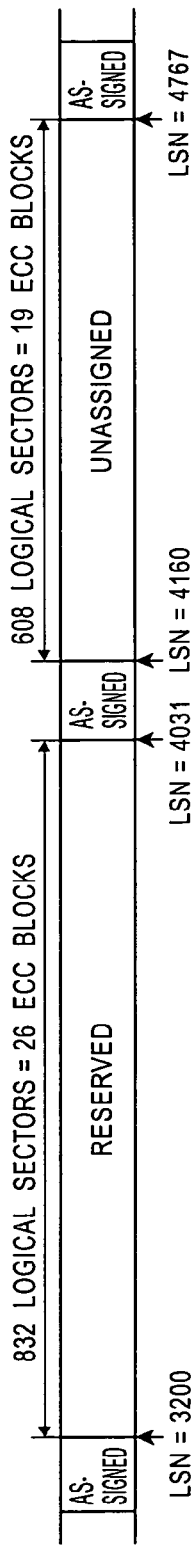
Figure 19B:
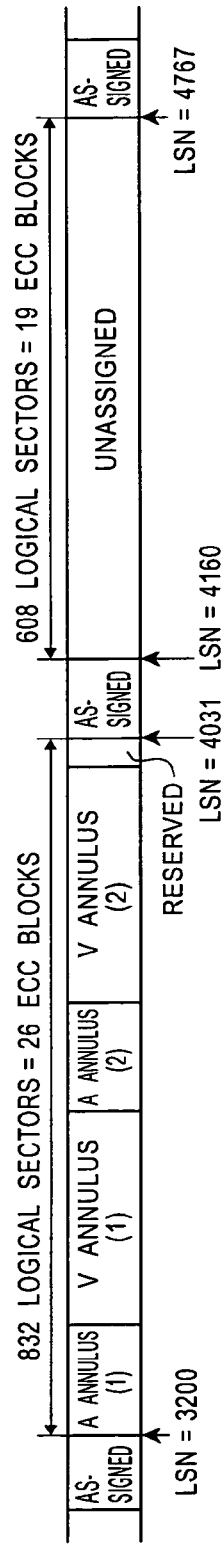
Figure 19C:
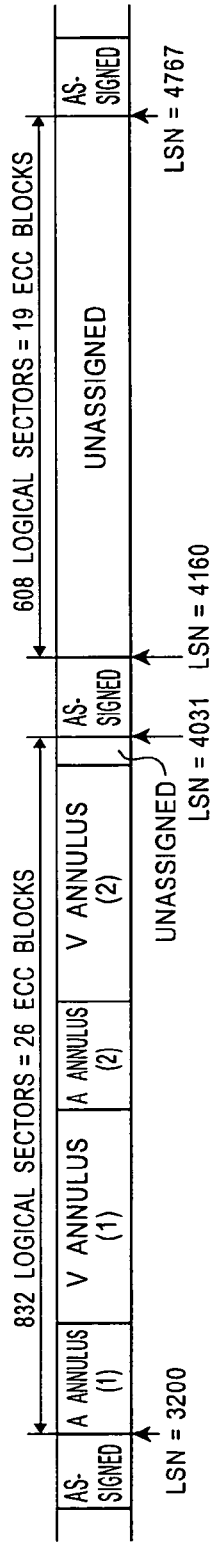

In the writing control process shown in FIG. 18, in step S31, similarly to step S21 in FIG. 13, the writing controller 38 reserves consecutive empty areas for the ALLOCATION_UNIT on the optical disk 3, and proceeds to step S32.

In step S32, the writing controller 38 determines whether consecutive empty areas on the optical disk 3 which follow the empty areas reserved in step S31 have a size less than a size represented by the ALLOCATION_UNIT. In step S32, when it is determined that the consecutive empty areas on the optical disk 3 which follow the empty areas reserved in step S31 have a size less than the size represented by the ALLOCATION_UNIT, that is, when, just after the reserved areas, there are consecutive empty areas having a size equal to or greater than the size represented by the ALLOCATION_UNIT, the process skips over step S33 and proceeds to step S34. Steps S34 to S37 respectively similar to steps S22 to S25 are performed.

In step S32, conversely, it is determined that the consecutive empty areas on the optical disk 3 which follow the empty areas reserved in step S31 have a size less than the size represented by the ALLOCATION_UNIT, the writing controller 38 proceeds to step S33, and further reserves, just after the reserved areas, consecutive empty areas having a size less than the size represented by the ALLOCATION_UNIT. Accordingly, in this case, the consecutive empty areas for the ALLOCATION_UNIT which are reserved in step S31, and the subsequent empty areas having a size less than the size represented by the ALLOCATION_UNIT are reserved as reserved areas.

The process proceeds to step S34, and steps S34 to S37 respectively similar to steps S22 to S25 are performed.

According to the writing control process shown in FIG. 18, the multiplexed data in FIG. 16A is recorded in the empty areas shown in FIG. 16B on the optical disk 3, as shown in FIG. 19.

In this case, at first, as described with reference to FIGS. 17A to 17F, empty areas which begin at logical sector #3200 and which are constituted by 18 consecutive ECC blocks represented by the ALLOCATION_UNIT are reserved as reserved areas (step S31).

Consecutive empty areas, just after the empty areas which begin at logical sector #3200 and which are constituted by 18 consecutive ECC blocks represented by the ALLOCATION_UNIT are less in size than the 18 consecutive ECC blocks represented by the ALLOCATION_UNIT. Accordingly, the consecutive empty areas, just after the empty areas which begin at logical sector #3200 and which are constituted by 18 consecutive ECC blocks represented by the ALLOCATION_UNIT are also reserved (step S33). As a result, as shown in FIGS. 19A to 19E, between two sets of consecutive empty areas, one constituted by logical sectors #3200 to #4031 and the other one constituted by logical sectors #4160 to #4767, the empty areas constituted by logical sectors #3200 to #4031 are reserved as reserved areas.

Multiplexed data in units of packets which can be recorded in the reserved areas is recorded (step S34). In this case, regarding the multiplexed data in FIG. 16A, not only the audio annulus (1) at the beginning, the video annulus (1), and the audio annulus (2), but also the video annulus (2) can be recorded in the reserved areas. Accordingly, the audio annulus (1), the video annulus (1), the audio annulus (2), and the video annulus (2) are reserved in the reserved areas. Part of the reserved areas left after recording the audio annulus (1), the video annulus (1), the audio annulus (2), and the video annulus (2) is freed (step S24).

After that, empty areas constituted by 18 consecutive ECC blocks are reserved as reserved areas again (step S31). In the example shown in FIGS. 19A to 19E, from logical-sector #4031 next to the logical sector in which the video annulus (2) is recorded, consecutive empty areas only in the logical sector #4031 can be reserved and is less in size than 18 consecutive ECC blocks. Therefore, since empty areas constituted by 18 consecutive ECC blocks cannot be reserved when logical sector #4031 next to the logical sector in which the video annulus (2) is recorded, empty areas which being at logical sector #4160 and which are constituted by 18 consecutive ECC blocks are reserved as reserved areas so that empty areas constituted by 18 consecutive ECC blocks can be reserved (step S31).

In this case, the empty areas constituted by logical sector #4031 are not used. The size of unused areas is greatly reduced, compared with a case in which, in the example in FIGS. 17A to 17F, the empty areas constituted by logical sectors #3712 to #4021 are not used.

Consecutive empty areas, just after the empty areas which begin at logical sector #4160 and which are constituted by 18 consecutive ECC blocks, are also less in size than the 18 consecutive ECC blocks represented by the ALLOCATION_UNIT. Accordingly, the consecutive empty areas, just after the empty areas which begin at logical sector #4160 and which are constituted by 18 consecutive ECC blocks, are also reserved (step S33). As a result, as shown in FIGS. 19A to 19E, between two sets of consecutive empty areas, one constituted by logical sectors #3200 to #4031 and the other one constituted by logical sectors #4160 to #4767, the consecutive empty areas #4160 to #4767 are reserved as reserved areas. In this case, regarding the multiplexed data in FIG. 16A, the audio annulus (3) next to the video annulus (2) finally recorded in the previous recording, the video annulus (3), and the audio annulus (4) can be recorded in the reserved areas. Thus, the audio annulus (3), the video annulus (3), and the audio annulus (4) are recorded in the reserved areas. Since, in this case, the result of recording the audio annulus (3), the video annulus (3), and the audio annulus (4) produces no remaining part of the reserved areas, part of the reserved areas is not particularly freed.

Subsequently, the multiplexed data in FIG. 16A is recorded on the optical disk 3 in a similar manner.

As described above, when consecutive empty areas for the ALLOCATION_UNIT are reserved as reserved areas and subsequent consecutive empty areas on the optical disk 3 are less than the size represented by the ALLOCATION_UNIT, consecutive empty areas, just after the reserved areas, are also reserved as reserved areas. Thus, the entirety of the consecutive empty areas which is less than the size represented by the ALLOCATION_UNIT is prevented from being unused and remaining. This enables efficient use of the recording areas of the optical disk 3.

As described above, a UDF (e.g., UDF 2.01) may be employed as the file system driver 33. The UDF defines management of empty areas by one of a space-bitmap-based method and an unallocated-space-entry-based method. The unallocated-space-entry-based method is better in ease of managing consecutive empty areas.

In the unallocated-space-entry-based method, one set of consecutive empty areas is expressed by one allocation descriptor. Accordingly, when empty areas are divided on the optical disk 3, one allocation descriptor is assigned to each set of consecutive empty areas. Thus, the entirety of empty areas on the optical disk 3 is expressed by allocation descriptors.

An allocation descriptor is a structure having two variables, an extent length and an extent position. The extent length represents the size of consecutive empty areas, for example, the number of bytes, and the extent position represents the logical sector number of a logical sector at the beginning of the consecutive empty areas. In general, the extent length is an integer multiple of the size of a logical sector. Thus, when the size of a logical sector is, for example, 2048 [bytes], as described above, the extent length is an integer multiple of 2048.

In order for the writing controller 38 to perform the writing control process described with reference to FIG. 13 or 18, the UDF used as the file system driver 33 may provide, for example, (operations) of three functions, "RESERVE_SPACE", "ALLOC_SPACE", "RELEASE_SPACE" to the writing controller 38, which is an upper layer.

The function RESERVE_SPACE has, for example, the arguments file_handle and "length". The argument "file_handle" represents a file handle, and the argument "length" represents the size of empty areas by using, for example the number of logical blocks. When the function RESERVE_SPACE (file_handle, length) is executed, the UDF searches the empty areas on the optical disk 3 for consecutive empty areas whose length is equal to or greater than the length designated by the argument "length", and reserves the empty areas as reserved areas for a file specified by a file handle designated by the argument file_handle. To execute the function RESERVE_SPACE(file_handle, length), the file specified by the file handle designated by the argument file_handle must be opened.

Also, the function RESERVE_SPACE(file_handle, length) sends back error_code and alloc_desc as return values. The return value error_code represents an error code and has different values for the case of reserving consecutive empty areas and for the case of not reserving consecutive empty areas due to a lack of empty area size. In the case of reserving consecutive empty areas, an allocation descriptor representing the consecutive empty areas is set in the return value alloc_desc.

Although the reserved areas obtained by executing the function RESERVE_SPACE(file_handle, length) is not assigned to another file until it is freed by executing the function RELEASE_SPACE (described later), when the file represented by the argument file_handle is closed without executing the function RELEASE_SPACE, reserved areas assigned to the file are freed similarly to the case of executing the function RELEASE_SPACE.

The function ALLOC_SPACE has, for example, file_handle and alloc_desc as arguments. A file handle is set in the argument file_handle and an allocation descriptor is set in the argument alloc_desc, and the function ALLOC_SPACE (file_handle, alloc_desc) is executed, whereby in reserved areas as consecutive empty areas represented by the allocation descriptor set in the argument alloc_desc, data of the file represented by the file handle set in argument file_handle is actually recorded. Information of the recording is reflected in a file system (file management information) managed by the UDF.

Recording areas, represented by the allocation descriptor set in the argument alloc_desc of the function ALLOC_S-PACE(file_handle, alloc_desc), must be all or part of recording areas represented by an allocation descriptor obtained as a return value of the function RESERVE_SPACE (file_handle, length).

Also, the function ALLOC_SPACE(file_handle, alloc_desc) sends back error_code as a return value. This return value error_code represents an error code, and has different values in a case in which the information representing recording of data is normally reflected in the file system managed by the UDF and in a case in which data is not recorded due to reasons such as the reason that areas represented by the allocation descriptor set in the argument alloc_desc are not reserved areas and, accordingly information representing recording of data is not normally reflected in the file system managed by the UDF.

The function RELEASE_SPACE has, for example, file_handle and alloc_desc as arguments. A file handle is set in the argument file_handle and an allocation descriptor is set in the argument alloc_desc, and the function RELEASE_SPACE(file_handle, alloc_desc) is executed, whereby reserved areas as consecutive empty areas which are assigned to the file represented by the file handle set in the argument file_handle and which are represented by the allocation descriptor set in the argument alloc_desc are freed.

The reserved areas, freed by executing the function RELEASE_SPACE(file_handle, alloc_desc) are to be reserved by the function RESERVE_SPACE(file_handle, length).

The function RELEASE_SPACE(file_handle, alloc_desc) sends back error_code as a return value. The return value has different values for the case of normally freeing the reserved areas as the consecutive empty areas represented by the allocation descriptor set in the argument alloc_desc and for the case of not normally freeing the reserved areas.

The above three functions, RESERVE_SPACE (file_handle, length), ALLOC_SPACE(file_handle, alloc_desc), and RELEASE_SPACE(file_handle, alloc_desc) are executed, for example, in the following manner.

When reserving the consecutive empty areas in step S21 in FIG. 13, or step S31 or S33 in FIG. 18, the writing controller 38 requests the UDF to execute the function RELEASE_SPACE(file_handle, length). In this case, for example, the size of consecutive empty areas to be reserved, such as the ALLOCATION_UNIT, is set in the argument "length".

Also, when recording multiplexed data in the recorded in step S22 in FIG. 13 or step S34 in FIG. 18, the writing controller 38 requests the UDF to execute the function ALLOC_SPACE(file_handle, alloc_desc). This reflects recording in the reserved areas of the multiplexed data in the UDF.

When freeing the remaining part of the reserved area in step S24 in FIG. 13 or step S36 in FIG. 18 after recording the multiplexed data, the writing controller 38 requests the UDF to execute the function RELEASE_SPACE(file_handle, alloc_desc). When the reserved areas is freed by the function RELEASE_SPACE(file_handle, alloc_desc), if there are empty areas just after the empty areas as the freed reserved areas, the UDF uses a single allocation descriptor to manage the empty areas as the freed reserved areas, regarding them as being incorporated with the empty areas just after them.

As described above, in the recording areas of the optical disk 3, consecutive empty areas for ALLOCATION_UNIT are reserved as recorded areas, and multiplexed data in units of packets which can be recorded in the reserved areas is recorded in the reserved areas, and a remaining part of the reserved areas in which the multiplexed data in units of packets is not recorded is freed as empty areas. Thus, it is guaranteed that items of the multiplexed data are consecutively written as many as the number of logical blocks which is a value obtained by subtracting the number of logical blocks (corresponding to the maximum value of the actual annulus size) from the ALLOCATION_UNIT. This can prevent seeking from occurring when the consecutively written multiplexed data is read and can prevent playback from being interrupted.

The present invention may be applied to, for example, disk recording media such as magnetic disks, other than optical disks, and to non-disk recording media.

What is claimed is:

1. A recording control apparatus for controlling data recording on a recording medium, comprising:
   a reference value determining unit determines a reference value of data to be recorded on the recording medium, the reference value being determined by a data rate and a presentation period of the data so that a reading time of the data is longer than a seeking time of non-consecutive data;
   area-reserving means for reserving, as reserved areas, predetermined-sized consecutive empty areas having a predetermined size for guaranteeing a real-time playback from among recording areas on the recording medium;
   recording control means for controlling recording of data in units of packets in the reserved areas;
   area-freeing means for freeing, as empty areas, a remaining part of the reserved areas in which the data in units of packets is not recorded;
   additional reserving means for additionally reserving, as the reserved areas, consecutive empty areas which follow the predetermined-sized consecutive empty areas reserved by said area-reserving means; and
   size-determining means for determining whether or not the consecutive empty areas which follow the predetermined-sized consecutive empty areas reserved by said area-reserving means have a size less than the predetermined size,
   wherein recording of data into the reserved area is terminated when the remaining part of the reserved area is less than the size of a packet to be recorded in the reserved area, and greater than zero,
   wherein the size of the packet is determined by the reference value and an alignment of the packet with a boundary of an adjacent ECC block of the recording medium,
   wherein when the reference value is not an integer number of an ECC block, the alignment is implemented by a moving of a front boundary of the packet and a rear boundary of the packet to agree with ECC block boundaries; and
   wherein, when the consecutive empty areas which follow the predetermined-sized consecutive empty areas reserved by said area-reserving means have a size less than the predetermined size, said additional reserving means additionally reserves, as the reserved areas, the consecutive empty areas which have the size less than the predetermined size.

2. A recording control apparatus according to claim 1, further comprising
   data-existence determining means for determining whether or not data to be recorded on the recording medium exists,
   wherein reservation of the predetermined-sized consecutive empty areas by said area-reserving means, and recording of the data in units of packets by said recording control means are repeatedly performed until there is no more data to be recorded on the recording medium.

3. A recording control apparatus according to claim 2, wherein,
among continuous empty areas of the recording areas on the recording medium which have a size equal to or larger than the predetermined size, from a continuous empty area having the largest size, a continuous empty area having the earliest position in order of reading or writing of data on the recording medium, and a continuous empty area closest to one recording area having last recorded data, one continuous empty area is reserved as each of the predetermined-sized consecutive empty areas by said area-reserving means.

4. A recording control apparatus according to claim 1, further comprising
remaining-part determining means for determining whether or not the reserved areas include a remaining part in which the data in units of packets is not recorded,
wherein, when the reserved areas include the remaining part in which the data in units of packets is not recorded, said remaining-part determining means frees the remaining part of the reserved area.

5. A recording control apparatus according to claim 1, further comprising
packetization means for packetizing data into packets each having a size by which alignment is established with physical unit areas on the recording medium,
wherein said recording control means controls recording of the data in units of the packets.

6. A recording control apparatus according to claim 5, wherein said packetization means comprises:
data-storage means for temporarily storing data;
storage-amount determining means for determining the amount of data stored in said data-storage means; and
data-extracting means in which, when the amount of data stored in said data-storage means reaches a reference value, data having a size by which alignment is established with the physical unit areas on the recording medium and which is closest to the reference size is extracted from said data-storage means and is output as a packet having a size by which alignment is established with the physical unit areas on the recording medium.

7. A recording control apparatus according to claim 6, wherein said data-extracting means extracts, from said data-storage means, data having the maximum size by which alignment is established with the physical unit areas on the recording medium.

8. A recording control apparatus according to claim 5, wherein:
said packetization means comprises a plurality of packetization means for packetizing a plurality of data series into packets; and
said recording control apparatus further comprises multiplexing means for multiplexing the packets corresponding to the plurality of data series which are output from the plurality of packetization means.

9. A recording control apparatus according to claim 8, wherein said plurality of multiplexing means multiplex the packets corresponding to the plurality of data series in ascending order of the presentation times of data items allocated in the packets.

10. A recording control apparatus according to claim 8, wherein said plurality of multiplexing means multiplex the packets corresponding to the plurality of data series in ascending order of the presentation times of data items allocated in packets which each have a size equal to a reference value and which are obtained when the plurality of data series are packetized.

11. A recording control method for controlling data recording on a recording medium, comprising the steps of:
determining a reference value of data to be recorded on the recording medium, the reference value being determined by a data rate and a presentation period of the data so that a reading time of the data is longer than a seeking time of non-consecutive data,
reserving, as reserved areas, predetermined-sized consecutive empty areas having a predetermined size for guaranteeing a real-time playback from among recording areas on the recording medium;
controlling recording in the reserved areas of data in units of packets, the data being capable of being recorded in the reserved area;
freeing, as empty areas, a remaining part of the reserved areas in which the data in units of packets is not recorded;
additionally reserving, as the reserved areas, consecutive empty areas which follow the predetermined-sized consecutive empty areas reserved by said area-reserving means; and
determining whether or not the consecutive empty areas which follow the predetermined-sized consecutive empty areas reserved by said area-reserving means have a size less than the predetermined size,
wherein recording of data into the reserved area is terminated when the remaining part of the reserved area is less than the size of a packet to be recorded in the reserved area, and greater than zero,
wherein the size of the packet is determined by the reference value and an alignment of the packet with a boundary of an adjacent ECC block of the recording medium,
wherein when the reference value is not an integer number of an ECC block, the alignment is implemented by a moving of a front boundary of the packet and a rear boundary of the packet to agree with ECC block boundaries; and
wherein, when the consecutive empty areas which follow the predetermined-sized consecutive empty areas reserved by said area-reserving means have a size less than the predetermined size, said additional reserving means additionally reserves, as the reserved areas, the consecutive empty areas which have the size less than the predetermined size.

12. A recording control method according to claim 11, further comprising the step of determining whether or not data to be recorded on the recording medium exists,
wherein the reserving step and the recording step are repeatedly executed until there is no more data to be recorded on the recording medium.

13. A recording control method according to claim 12, wherein, in the reserving step, among continuous empty areas of the recording areas on the recording medium which have a size equal to or larger than the predetermined size, from a continuous empty area having the largest size, a continuous empty area having the earliest position in order of reading or writing of data on the recording medium, and a continuous empty area closest to one recording area having last recorded data, one continuous empty area is reserved as each of the predetermined-sized consecutive empty areas.

14. A recording control method according to claim 11, further comprising the step of determining whether or not the reserved areas includes a remaining part in which the data in units of packets is not recorded, wherein, in the freeing step, when the reserved areas include a remaining part in which the data in units of packets is not recorded, the remaining part is freed.

15. A recording control method according to claim 11, further comprising the step of packetizing data into packets which each have a size by which alignment is established with physical unit areas on the recording medium, wherein, in the recording controlling step, recording of data in units of the packets is controlled.

16. A recording control method according to claim 15, the packetizing step comprises the steps of:

determining the amount of data stored in a storage means for temporarily storing data; and extracting, when the amount of data stored reaches a reference value, from the storage means, data having a size by which alignment is established with the physical unit areas on the recording medium and which is closest to the reference size so that the extracted data is output as a packet having a size by which alignment is established with the physical unit areas on the recording medium.

17. A recording control method according to claim 16, wherein, in the extracting step, data having the maximum size by which alignment is established with the physical unit areas on the recording medium is extracted from the storage means.

18. A recording control method according to claim 15, further comprising the steps of:

packetizing a plurality of data series into packets; and multiplexing the packets corresponding to the plurality of data series.

19. A recording control method according to claim 18, wherein, in the multiplexing step, the packets corresponding to the plurality of data series are multiplexed in ascending order of the presentation times of data items allocated in the packets.

20. A recording control method according to claim 18, wherein, in the multiplexing step, the packets corresponding to the plurality of data series are multiplexed in ascending order of the presentation times of data items allocated in packets which each have a size equal to a reference value and which are obtained when the plurality of data series are packetized.

21. A computer-readable non-transitory medium having a program recorded thereon, said program for allowing a computer to perform a recording control method for controlling data recording on a recording medium, the recording control method comprising the steps of:

determining a reference value of data to be recorded on the recording medium, the reference value being determined by a data rate and a presentation period of the data so that a reading time of the data is longer than a seeking time of non-consecutive data, reserving, as reserved areas, predetermined-sized consecutive empty areas having a predetermined size for guaranteeing a real-time playback from among recording areas on the recording medium;

controlling recording in the reserved areas of data in units of packets, the data being capable of being recorded in the reserved area, and greater than zero;

freeing, as empty areas, a remaining part of the reserved areas in which the data in units of packets is not recorded;

additionally reserving, as the reserved areas, consecutive empty areas which follow the predetermined-sized consecutive empty areas reserved by said area-reserving means; and determining whether or not the consecutive empty areas which follow the predetermined-sized consecutive empty areas reserved by said area-reserving means have a size less than the predetermined size, wherein recording of data into the reserved area is terminated when the remaining part of the reserved area is less than the size of a packet to be recorded in the reserved area, wherein the size of the packet is determined by the reference value and an alignment of the packet with a boundary of an adjacent ECC block of the recording medium, wherein when the reference value is not an integer number of an ECC block, the alignment is implemented by a moving of a front boundary of the packet and a rear boundary of the packet to agree with ECC block boundaries; and wherein, when the consecutive empty areas which follow the predetermined-sized consecutive empty areas reserved by said area-reserving means have a size less than the predetermined size, said additional reserving means additionally reserves, as the reserved areas, the consecutive empty areas which have the size less than the predetermined size.

* * * * *